United States Patent
Gitelman et al.

(10) Patent No.: US 10,853,358 B2
(45) Date of Patent: Dec. 1, 2020

(54) DISTRIBUTED DATA PROCESSING IN MULTI-TENANT ENVIRONMENTS

(71) Applicant: salesforce.com, inc., San Francisco, CA (US)

(72) Inventors: Alex Gitelman, Berkeley, CA (US); Stephen Petschulat, Vancouver (CA); Alex Field, Vancouver (CA); Torrey Teats, Indianapolis, IN (US)

(73) Assignee: salesforce.com, inc., San Francisco, CA (US)

( * ) Notice: Subject to any disclaimer, the term of this patent is extended or adjusted under 35 U.S.C. 154(b) by 363 days.

(21) Appl. No.: 16/024,264

(22) Filed: Jun. 29, 2018

(65) Prior Publication Data
US 2020/0004858 A1 Jan. 2, 2020

(51) Int. Cl.
*G06F 16/242* (2019.01)
*G06F 16/25* (2019.01)
*G06F 16/2455* (2019.01)
*G06F 16/2458* (2019.01)
*G06F 16/2453* (2019.01)

(52) U.S. Cl.
CPC ...... *G06F 16/2448* (2019.01); *G06F 16/2456* (2019.01); *G06F 16/2471* (2019.01); *G06F 16/24534* (2019.01); *G06F 16/252* (2019.01)

(58) Field of Classification Search
CPC . G06F 16/2448; G06Q 50/01; G06Q 30/0606
See application file for complete search history.

(56) References Cited

U.S. PATENT DOCUMENTS

| | | | |
|---|---|---|---|
| 2005/0044007 A1* | 2/2005 | Shitomi | G06Q 30/0601 705/26.1 |
| 2016/0246616 A1* | 8/2016 | Kwong | G06Q 50/01 |

* cited by examiner

*Primary Examiner* — Etienne P Leroux
(74) *Attorney, Agent, or Firm* — Holland & Hart LLP

(57) ABSTRACT

Methods, systems, and devices for data processing within a distributed data system are described. In a multi-tenant distributed data system, a provider may supply executable code for processing data using declarative processing instructions received from a tenant. For example, a tenant may provide tenant-specific processing instructions for a requested set of data. The processing instructions may indicate input information (e.g., a data structure, tenant-specific fields, etc.), transformation information (e.g., from a set of pre-defined transformations), and output information. The provider-supplied code may use the tenant-specific processing instructions to process and generate the requested set of data, where the code may be executed by multiple nodes within the system. As such, the code executed by multiple nodes may utilize the input information, transformation information, and output information from the tenant-specific processing instructions to generate the requested data and provide the data to the tenant.

20 Claims, 12 Drawing Sheets

US 10,853,358 B2

DISTRIBUTED DATA PROCESSING IN MULTI-TENANT ENVIRONMENTS

FIELD OF TECHNOLOGY

The present disclosure relates generally to database systems and data processing, and more specifically to distributed data processing in multi-tenant environments.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may be supported by a number of data stores within a distributed database system. Data processing in a system with distributed data stores may be enabled by coherently running an application on multiple computing devices for querying data within different data stores, performing operations or transformations on the data, and providing the results to a user. Organizations and users may query for data from these distributed data stores to aid in making business decisions, projecting future transactions, etc. However, data processing in such systems may be static, relying on code that is developed for specific processing requests. For instance, a developer may build a program for retrieving a particular set of data from a distributed data processing system, and retrieval of the data may be determined by the processing logic associated with the program. But different queries (e.g., for different types of data) may require different data processing logic, potentially increasing costs in developing additional or modified code for processing an organization's data. Further such approaches may be particularly problematic in a multi-tenant environment. For instance, different organizations (i.e., tenants) may have different data models, requiring appropriate (e.g., tenant-specific) code to handle different queries by respective organizations. Allowing individual organizations to develop their own code to be executed against a system storing data belonging to multiple organizations may compromise the security of the date stored by the system. For example, a tenant may develop tenant-specific code for execution against the multi-tenant database that performs one or more processes that inefficiently utilize resources at the database (e.g., memory resources, processing resources, etc.), utilize an amount of database resources greater than a resource threshold or for a length of time greater than a temporal threshold (i.e., unfairly sharing the database resources with the other tenants of the system), access or modify data not owned by the tenant, or perform any combination of these or other functions harmful to the database system.

DETAILED DESCRIPTION

Figure 1:
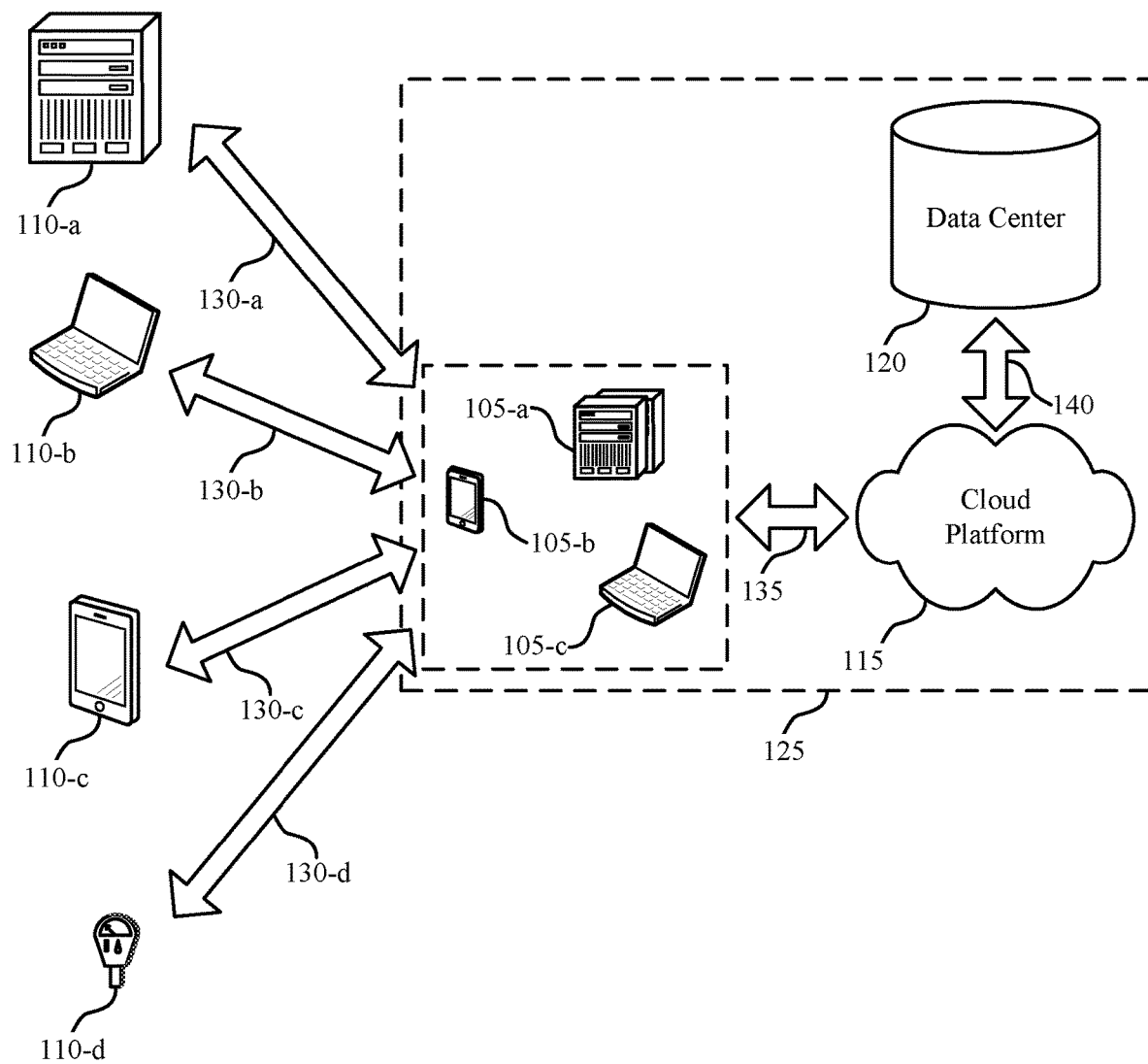
FIG. 1 illustrates an example of a system for data processing within a multi-tenant distributed data system that supports distributed data processing in multi-tenant environments in accordance with aspects of the present disclosure.

Some database systems may utilize multiple nodes within a network for processing distributed data from various data stores. For example, in a distributed data system, multiple nodes or devices may be arranged such that data processing capabilities are spread throughout the network, where individual nodes (and/or data stores) may be separate from the location of the user or organization requesting the data to be processed, as well as physically separate from other nodes and/or data stores in the system. Each node may be in communication with each other through wired or wireless links, and operations on sets of data (e.g., extract, transform, and load (ETL) operations, data queries, etc.) may be coherently performed by different nodes throughout the system. In some cases, a node that is physically located close to a data store may be the node that performs a particular set of operations on that local data store, thereby avoiding the need to move data to a central location for processing. Accordingly, distributed data processing systems may provide for scalable data networks that are capable of efficiently processing large volumes of data.

In some systems, operations performed by the multiple nodes may be directed by a controlling node. For instance, multiple computing nodes (e.g., worker nodes, slave nodes, executor nodes, or other like terminology) may receive processing instructions from a controlling node (e.g., a master node, a driver node, or other like terminology) to execute some or all aspects of a program received at the controlling node. Such systems may utilize various techniques and technologies for processing distributed data, which may be based on, for example, a map-reduce model, which may optimize data processing in systems with large amounts of distributed data. In some cases, a program may be built (e.g., using programming languages such as Java, Scala, Python, etc.) for execution on worker nodes that are relatively close to the data to be processed, and these programs may be constructed or built with a specific data model or structure in mind. For example, an organization may want to process logs from the organization's datacenter. The format of the logs may be known by the organization, and the program may be coded and tested to specifically handle data processing requests for the logs within a distributed data system. In some cases, if the format of the logs changes, the program or the program's configuration may also have to be updated.

However, it may be desirable to handle more than specific, static, data processing tasks. In particular, a distributed data system that houses data for several organizations (or tenants) may be managed by a provider organization, and developing separate programs for some or each of these organizations to query their data in the multi-tenant distributed data system may be costly and inefficient for the provider. Additionally or alternatively, a variety of security concerns may arise from allowing different tenants to develop their own code to be executed on the multi-tenant distributed data system, potentially requiring additional oversight by the provider organization, or additional program development costs incurred by the tenant, to ensure data security and high system performance within the multi-tenant distributed data system.

As described herein, techniques may be used to allow the dynamic management of tenant queries against a multi-tenant database using distributed data processing. Such techniques may reduce security liabilities, improve processing efficiency, and allow for scalability and flexibility when processing tenant queries. For example, a tenant may seek tenant-specific data from a distributed data store and provide tenant-specific processing instructions for querying and processing the data. For example, the processing instructions may be provided to a master node (e.g., a master data server that controls other, localized, servers, server clusters, or nodes) within a distributed data system. The tenant-specific processing instructions, or "recipe," may be a declarative object that includes information indicating what data is to be retrieved, any desired computations or transformations to that data, and the requested output that the tenant desires. Additionally, an administrator or provider organization may also supply the master node with an underlying program or code to be used in conjunction with the tenant's processing instructions. For instance, the program supplied by the provider may utilize the inputs, transformations, and outputs indicated by the tenant's processing instructions for execution against the distributed data system to identify the requested data, perform the indicated transformation(s), and return the requested output to the tenant. As such, the tenant may avoid development of their own code to perform such data processing from the distributed system (particularly when custom fields specific to that tenant are needed), as the tenant only provides the declarative recipe indicating a particular set of information that is readily handled by the provider-supplied code. Further, the provider may ensure data security and system efficiency is maintained within the system, as the code executed against the system may be developed in-house (or is otherwise known and tested) by the provider, and is dynamically modified for different queries (and/or for different tenants) by the declarative inputs supplied by the tenant.

Aspects of the disclosure are initially described in the context of a system supporting an on-demand database service. Additional aspects of the disclosure are described with respect to system architectures, distributed data systems (e.g., including data extraction and query handling), and a process flow. Aspects of the disclosure are further illustrated by and described with reference to apparatus diagrams, system diagrams, and flowcharts that relate to data processing using multiple data stores in a multi-tenant database system.

FIG. 1 illustrates an example of a system 100 for cloud computing that supports distributed data processing in multi-tenant environments in accordance with various aspects of the present disclosure. System 100 may support dynamic data processing for multiple tenants using declarative processing instructions with code supplied by a provider of a multi-tenant distributed data system. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, system 100 may include a number of data stores utilizing a distributed data scheme, and system 100 may support shared access by multiple organizations (or tenants), for example, having data stored within one or more data stores across the system. Data processing in a system with distributed data may be enabled by coherently running an application on multiple computing devices that have access to data within different data stores, performing operations, computation, or transformations on the data, and providing the results to a user. For instance, some distributed data processing systems may be built on map-reduce algorithms. Map-reduce algorithms may be used for the processing and generation of large sets of data, where these algorithms may be distributed to the computing devices (e.g., as part of a cluster) for parallel processing. In some examples, the distributed data system may be managed by a single entity or organization (e.g., a provider) that supplies access to the distributed system to customers (e.g., the tenants).

In some cases, a tenant may have data stored in a particular format (e.g., logs, data records, data object-specific formats, etc.) within system 100, and the tenant may want to process these logs to obtain certain information, which may result in a significant amount of data. For example, data processing may involve a large volume of input data, a number of computational operations (e.g., transformations), and a large volume of output data. When processing this data, the tenant may know which logs are stored within a distributed data system, and may also know the structure or format of the information to be queried (e.g., a data record or log may include a timestamp first, a log record following the timestamp, etc.). Accordingly, there may be a large number of logs belonging to the tenant (e.g., containing millions of lines of data), where the logs may have a specific structure, and the tenant may want to perform various operations on the data within the logs.

When querying the information for data processing, a particular code may be built (e.g., using one or more programming languages such as Java, Python, structured query language (SQL), etc.) that defines a processing logic for retrieving data from the logs. In a distributed data system, a user may provide the code to a master node, and the master node may transmit the code to worker nodes for execution, where the master node may parse or distribute the processing tasks among the worker nodes based on a distribution function or algorithm. For instance, each worker node may read portions of the set of data being requested, processes the data, and, in some cases, may write the data back to a distributed data store in the system. The specific computations on the requested data may be based on the processing logic provided in the executable code.

In conventional systems, a provider of a distributed data system may develop executable code for tenants such that the tenants may retrieve their data, where the code may, for example, be packaged and provided to the tenant as a service. However, the provider may not know what data the tenant wants to process each time the system is queried, and it may be difficult to quickly develop customized code for tenant-specific queries. For example, a provider of a system with data stored in a distributed manner may not know the shape or format of each tenant's data. That is, data formats may vary from tenant to tenant. The provider also may not know where the customer wants to obtain the data from each time (e.g., which of multiple data stores or external data sources the data should be retrieved from). In other cases, the provider may be aware of the specific inputs, but may not know what to do with the data each time the tenant performs data processing (e.g., such as in the case were a tenant-specific custom field is needed, or when transformations that are specific to a particular tenant are used). In any case, it would be difficult for the provider to write the specific code for separate processing requests, for each tenant, which may further require some amount of tenant-specific coding each time a new (or modified) processing request is considered.

Additionally, the provider of a conventional distributed data system may not want the tenant to write their own code for execution on the provider's system. Allowing the tenant to create their own code for data processing using the distributed data system may pose security risks for other tenants sharing the multi-tenant system. For example, if a tenant creates their own custom code for execution directly on the multi-tenant distributed data system, the tenant may inadvertently (or maliciously) obtain data that belongs to one or more other tenants. The provider may not be able to control what the tenant-developed code can or cannot do, and such security risks may go unnoticed with tenant-developed code. The tenant also may lack proficiency in some programming languages, which may inhibit their ability to derive code that effectively or efficiently queries the data they need access to. In other examples, the tenant may inadvertently (or maliciously) develop code that demands a significant amount of system processing or memory resources (e.g., due to any number of complex processing instructions included in their code, such as an endless loop that unnecessarily ties up system memory or processing power). Additionally, the tenant may have to pay a developer/consultant to develop the code, which may result in greater costs incurred by the tenant. Thus, the conventional systems may introduce data security risks, processing inefficiencies, and/or uneven allocation of resources to tenants of the database system.

In contrast, system 100 may support a provider controlling the code that is executed against the system, while also constructing the code in such a way that different data processing requests from different tenants may be dynamically handled. Specifically, as described herein, data processing within a multi-tenant distributed data system may be performed through the use of provider-supplied code and declarative processing instructions provided by a tenant. For instance, in system 100, a provider may develop executable code that is maintained at a master node and used for processing data using tenant-specific processing instructions that are also provided to a master node. In such cases, the provider may supply the code that includes the processing logic that filters the data the tenant can access, retrieves the data from respective data stores, performs any requested transformations, and provides requested outputs, all of which may be based on the tenant-specific processing instructions supplied by respective tenants. As the provider supplies this processing logic, the provider can test the code and ensure that the code limits a tenant to accessing data owned or otherwise marked as accessible for that tenant, as well as efficiently and fairly uses the resources (e.g., processing resources, memory resources, etc.) of the database system. The code may also support dynamic handling for different types of data and requests for different tenants. For example, the processing instructions provided by a tenant may indicate input information (e.g., a data structure, tenant-specific fields, etc.), transformation information (e.g., from a set of pre-defined transformations), and output information. The provider-supplied code may use the tenant-specific processing instructions to process and generate the requested set of data, where the code may be executed by multiple worker nodes within the system. Accordingly, the code executed by multiple nodes may utilize the input information, transformation information, and output information from the tenant-specific processing instructions to securely and efficiently generate the requested data and provide the data to the tenant.

It should be appreciated by a person skilled in the art that one or more aspects of the disclosure may be implemented in a system 100 to additionally or alternatively solve other problems than those described above. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
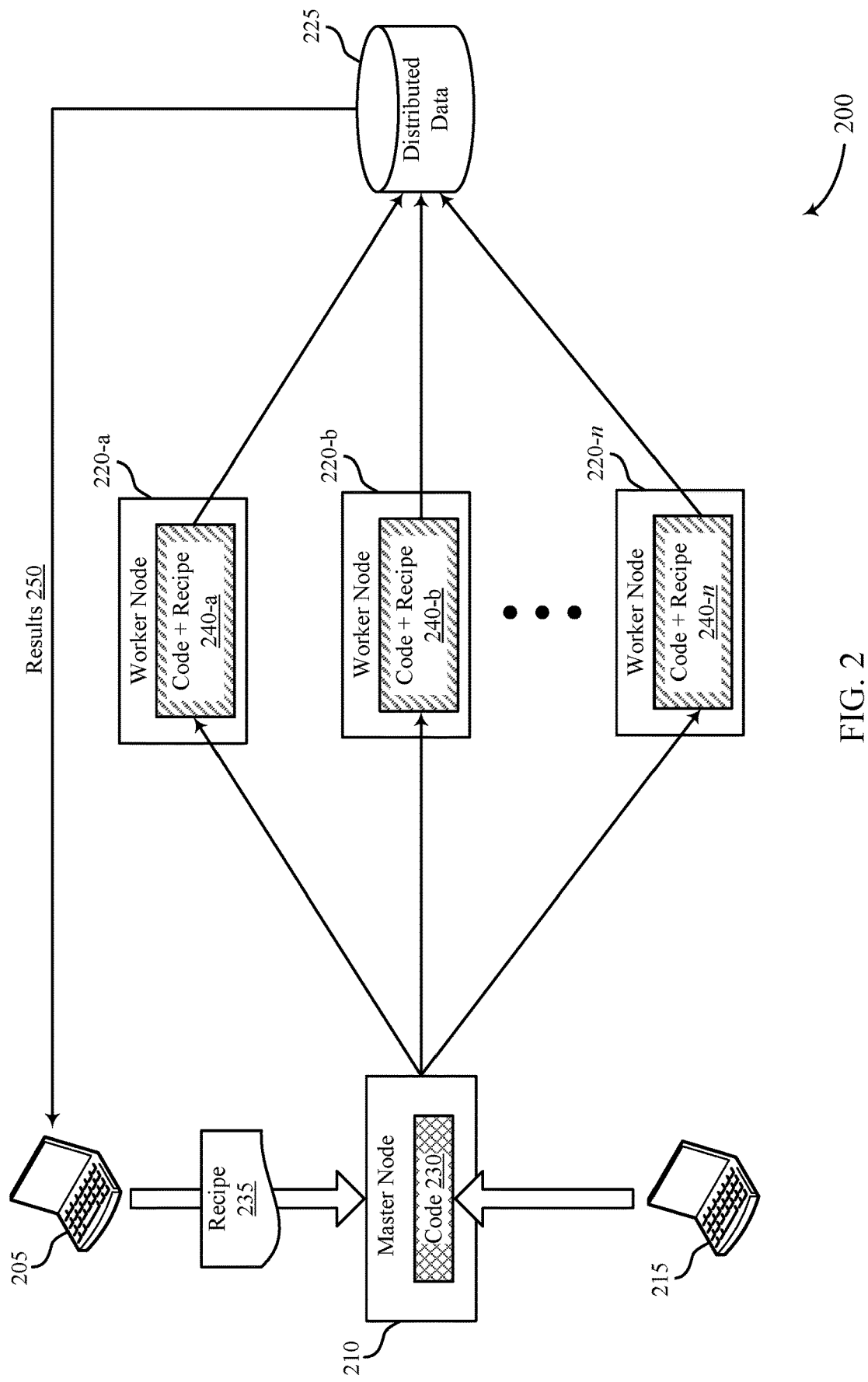
FIG. 2 illustrates an example of a distributed data system that supports distributed data processing in multi-tenant environments in accordance with aspects of the present disclosure.

FIG. 2 illustrates an example of a distributed data system 200 that supports distributed data processing in multi-tenant environments in accordance with various aspects of the present disclosure. Data processing within distributed data system 200 may be performed by a tenant user device 205, a master node 210, and a provider user device 215. Additionally, master node 210 may control or direct data processing functions performed at one or more worker nodes 220, and distributed data system 200 may further include distributed data store 225, which may be an example of one or more data stores. Distributed data system 200 may support the use of code 230 for data processing that is based on declarative instructions (e.g., within a recipe 235) provided by respective tenants, where code 230 and recipe 235 may be executed by worker nodes 220. As such, distributed data system 200 may support techniques that enable dynamic data processing using a single code or program that is capable of securely and efficiently handling various tenant-specific data processing requests.

Distributed data system 200 may be an example of a system that utilizes multiple nodes (e.g., including master node 210 and one or more worker nodes 220, each of which may be an example of a computer, a server, a cluster of computing devices, a server cluster, a terminal, a virtual machine, a container, etc.) for processing data. Each of the nodes may be dispersed throughout a provider organization, may be found in different physical locations, and may also be controlled by or interact with a central computer (such as master node 210). Accordingly, master node 210 and worker nodes 220 (e.g., worker nodes 220-a through 220-n) may communicate with each other to process data that is distributed throughout the system using an algorithm provided to master node 210. In such cases, master node 210 may utilize processing logic (e.g., obtained from code 430 or pre-configured at the master node 210) to allocate data processing jobs to one or more worker nodes 220. For instance, each of worker nodes 220-a through 220-n may be physically located close to respective data stores in the system, and may retrieve, extract, and transform data within the local data stores based on the processing logic. Additionally or alternatively, master node 210 may distribute processing jobs to different worker nodes 220 based on available resources at the worker nodes 220, an actual or estimated overhead associated with the processing jobs, or some combination of these. Distributed data system 200 also may provide various levels of redundancy and autonomy in data processing tasks.

In some examples, distributed data system 200 may be used for data processing by a number of different tenants (e.g., organizations, businesses, companies, etc.) that have data stored within distributed data stores. For instance, two or more tenants may have data stored within stores of distributed data store 225, and a tenant may transmit requests or queries to the distributed data system 200 to obtain their data, for example, to perform data analysis, reporting, data validation, sorting, summarization, aggregation, etc. In some cases, the distributed data system 200 may forward these requests or queries to the master node 210 for processing and/or distribution (e.g., where the master node 210 may act as a gateway to the worker nodes 220 of the system). In other cases, the master node 210 may intercept these requests or queries as they enter the distributed data system 200.

To enable the tenants to efficiently process data from distributed data system 200, a user within a provider organization (e.g., a company or organization that manages, maintains, and provides distributed data system 200 for use by the tenants) operating a provider user device 215 may build or develop code 230 that is provided to master node 210, where code 230 may be used for dynamically managing different data processing requests received from different tenants. In some cases, the provider may write executable code 230 that is the same regardless of which tenant transmits their tenant-specific processing instructions (e.g., recipe 235), which type of data the tenants are trying to query, the structure of the tenants data, and whether the tenants are querying custom fields associated with their data. In other words, the executable code may identify tenant data to be retrieved from distributed data store 225, and may utilize declarative inputs from recipe 235 such that, when executed, code 230 enables the nodes within distributed data system 200 to process a requested set of data per the declarative inputs. In some cases, code 230 may be transmitted to master node 210 by provider user device 215, and code 230 may be retained by master node 210 to handle incoming data processing requests received from one or more tenants having data stored in distributed data system 200. The provider may also update code 230 from time to time, for example, to update to code to allow processing of additional transformations or custom fields added for use by one or more tenant user devices 205. For instance, code 230 may be capable of performing a set of transformations that are available to all tenants, where the set of transformations may be modified and/or updated periodically or aperiodically by an authorized user (e.g., a user associated with the provider organization).

Tenant user device 205 (e.g., a device operated by a user associated with a tenant organization) may transmit a request (e.g., recipe 235) that includes a description of information associated with a requested set of data. For instance, recipe 235 may describe input data (e.g., what types of data is sought, fields that are requested for analysis, etc.), describe calculations or transformation to be applied to the data, and describe a desired output for the requested set of data. Additionally, recipe 235 may also include or indicate a tenant identifier (ID). For example, recipe 235 may include an explicit tenant ID value, or master node 210 may determine a tenant ID based on receiving recipe 235 (e.g., based on a header included with recipe 235, based on an Internet Protocol (IP) address of the transmitting tenant user device 205, etc.). Recipe 235 may also describe respective fields or pieces of data that, for example, may be joined together, and recipe 235 may further specify other operations to be performed on the requested data.

In some cases, datasets and data records stored within distributed data system 200 may be associated with the tenant ID. Storage of data may thus be structured around the tenant ID such that there is a separation of data belonging to different tenants (e.g., each data record stored in memory of a database may include a filterable tenant ID field). As a result, data may be pre-filtered to ensure that, when code 230 is executed, the tenant obtains outputs that consist of data that the tenant has access to. Data that the tenant does not have access to is therefore filtered out by the system, and the tenant's requested set of data is retrieved from only data that corresponds to the tenant ID for tenant user device 205. Similarly, in some cases, a specific user of a tenant may have a certain authorization level, where the specific user may not have access to a subset of the tenant's data. In these cases, the data may be further filtered based on the user ID (e.g., a username, password, personal identification number (PIN), etc.). Likewise, respective recipes 235 may be specific to a particular tenant or user within the tenant, and security measures may be enforced by the system framework such that the tenant or user may not have an opportunity to obtain data belonging to other tenants (inadvertently or otherwise).

The tenant-specific recipe 235 may be used to indicate known information that is configured by the provider (e.g., including tenant-specific fields), and the provider-supplied code 230 may be executed against distributed data system 200, removing any need for custom-built code for tenant queries. For instance, code 230 may support a number of custom fields that are specific to respective tenants, and the tenants may only have to indicate the custom fields in recipe 235 when transmitting the processing instructions. Likewise, transformations indicated by a recipe 235 may specify one or more transformations that are selected from a set of predefined transformations. Accordingly, the provider-supplied code 230 may be responsible for processing and transforming the tenant's data based on known data structures, and also may be dynamically used for various organizations and customer needs. That is, code 230 may adaptively use the declarative processing instructions in recipe 235 without the need for query-specific or tenant-specific coding by the tenant. In some cases, code 230 may be written in a programming language that enables the described data processing, which may include Java (e.g., Java archive (JAR) files), Python, Scala, Go (or Golang), or another programming language not explicitly described herein.

Upon receiving the transmission of recipe 235, master node 210 may determine how to distribute code 230 (in addition to the declarative instructions indicated by recipe 235) between the worker nodes 220 for execution. As an example, some worker nodes 220 may be physically closest to a data store or database storing a dataset that the tenant has access to, and master node 210 may select the worker nodes 220 for execution of aggregated code and recipe instructions 240 based on the location of the datasets and/or worker nodes 220. In other cases, a particular worker node 220 may be selected to perform a particular set of functions in accordance with the aggregated code and recipe instructions 240. In yet other cases, master node 210 may distribute the aggregated code and recipe instructions 240 across worker nodes 220 or across different nodes within a node cluster based on processing capabilities or available resources at the worker nodes 220. In any case, the aggregated code and recipe instructions 240 may be transmitted to one or more worker nodes 220 for execution to generate the requested set of data. As an illustrative example, a first worker node 220-*a* may receive a first portion of the aggregated code and recipe instructions 240-*a*, while a second worker node 220-*b* may receive a second portion of the aggregated code and recipe instructions 240-*b*, and so forth (e.g., up to and including worker node 220-*n* with aggregated code and recipe instructions 240-*n*). In some cases, the parsing and distribution of code 230 to process data in accordance with the instructions provided in recipe 235 may be based on a number of worker nodes 220 in the system, an availability of different worker nodes 220 within the system, the availability of processing or memory resources in the system, the distribution of processing or memory resources across worker nodes 220 in the system, etc.

Each of the worker nodes 220 that execute an instance of the aggregated code and recipe instructions 240 may retrieve the requested set of data from distributed data store 225, and may perform any number of requested transformations on the data. In some cases, and as described below, the transformations performed by the worker nodes 220 may be selected from a predetermined set of transformations (e.g., as configured by provider user device 215). Additionally, worker nodes 220 may, after extracting and transforming the tenant's requested set of data, publish the results as a new entity (e.g., a data file having a format or structure as indicated by recipe 235), which, in some cases, may be saved to (e.g., stored in memory at) distributed data store 225. For example, the output information indicated by recipe 235 may designate a table having a particular format, and worker nodes 220-*a* through 220-*n* may join different datasets to create the requested output table and store the output table within distributed data store 225. Subsequently, the results 250 may be transmitted to the tenant user device 205. In other cases, the tenant user device 205 may retrieve the saved result 250 from distributed data store 225.

The solutions supported by distributed data system 200 may allow an end user (e.g., a tenant) to act on a limited list of operations (e.g., math equations, data grouping, string manipulations, etc.) to perform data processing on a multi-tenant distributed data store without developing complex customized code. In such cases, because the customer intent is explicitly declared through recipe 235, the likelihood of a tenant exploiting the distributed data processing system or gaining access to information that the tenant does not have access to (whether intentionally or otherwise) may be reduced. For instance, each job may only run on data which that user/tenant has access to. Further, the recipe implementation may pre-filter all the data the user does not have access to when it is executed, thereby reducing security risks within the system. Additionally, each operation may be monitored independently, and system-level abuses may be causally linked through monitoring. In this case, the tenant is not allowed to create executable code. Instead, the provider, and not the tenant, has access (e.g., direct access) to code 235, and the tenant may only be required to state what information they want and what to do with it. Accordingly, the responsibility for retrieving data efficiently is moved away from the tenant, which may avoid certain security pitfalls in multi-tenant systems, provide a better customer experience for the tenant, and enable dynamic data processing schemes. It is noted that, while the techniques described herein are discussed with reference to multi-tenant systems and operations, the techniques may be performed in other systems and environments, including database systems, client-server models, mobile (or wireless) technology and devices, wearable devices, on-demand services, and so forth.

Figure 3:
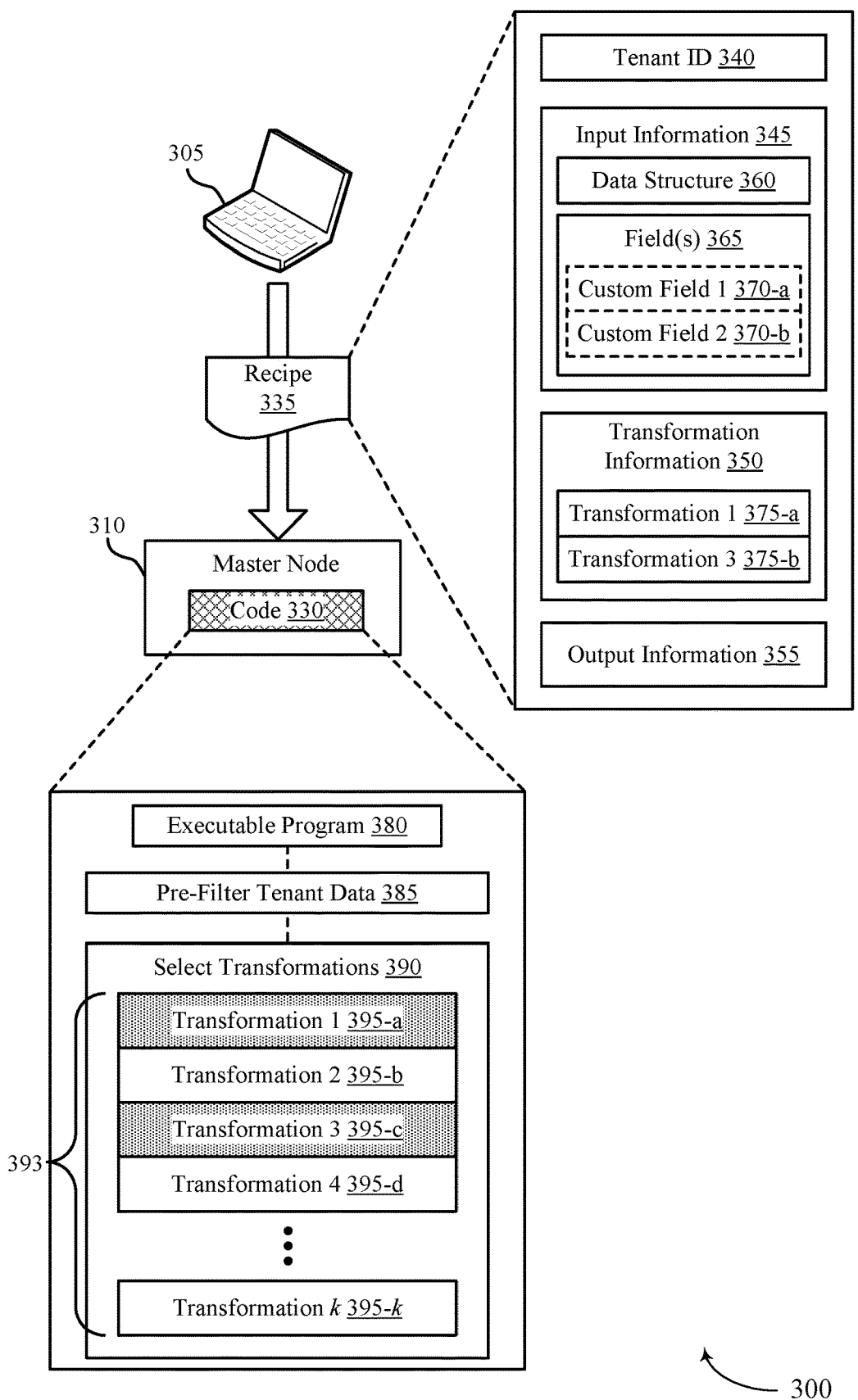
FIG. 3 illustrates an example of tenant-specific processing instructions and executable code that support distributed data processing in multi-tenant environments in accordance with aspects of the present disclosure.

FIG. 3 illustrates an example of tenant-specific processing instructions and executable code 300 that support distributed data processing in multi-tenant environments in accordance with various aspects of the present disclosure. Tenant-specific processing instructions and executable code 300 may illustrate a transmission, from a tenant user device 305 to a master node 310, that includes a recipe 335 (e.g., the tenant-specific processing instructions) that is used in conjunction with code 330 (e.g., the executable code). Additionally, tenant-specific processing instructions and executable code 300 may illustrate the contents of recipe 335 and code 330 that enables a tenant to dynamically perform various data processing requests against a multi-tenant distributed data system.

As described above with reference to FIG. 2, code 330 may be provided to master node 310 by a provider organization (e.g., via a provider user device), and code 330 may be constructed in such a way that a tenant may only need to provide a set of declarative instructions in recipe 235 to perform data processing in the system (e.g., without having to create customized code for specific requests). That is, the provider may supply the program used for processing data that tenant user device 305 requests, and the tenant (or a tenant developer) may provide the processing instructions in the form of a recipe to be handled by that program. Additionally, in order for tenant user device 305 to generate and transmit recipe 335, a user at the tenant organization may provide a recipe that is built (e.g., by the provider) using a set of user interface (UI) tools. As such, recipe 335 may have a format that is recognized by code 330, which may include the ability to include a certain set of fields or indicators in recipe 335 that are available to the user, but the user may not be required to use any specific number of fields when generating recipe 335.

Accordingly, recipe 335 may include metadata that describes input data, output data, and computations that the user wants to perform on the data. As an example, recipe 335 may be a file having a certain format (e.g., a text file utilizing JavaScript object notation (JSON), extensible markup language (XML), or any other programming language/format not explicitly described herein) that describes input tables, transformations to be applied, and results tables. For instance, recipe 335 may include one or more of a tenant ID 340, input information 345, transformation information 350, or output information 355.

As mentioned above, tenant ID 340 may be associated with the tenant and/or tenant user device 305 supplying recipe 335 for data processing, and may identify subsets of data within the distributed data system that the tenant has access to. In some cases, tenant ID 340 may be included in a header of the transmission containing recipe 335. Input information 345 may also include additional information regarding the data being requested for processing. For instance, input information 345 may include a data structure 360 and one or more fields 365. Data structure 360 may provide an indication of the structure or format of the tenant's data to be retrieved from different data stores. As an example, data structure may indicate that the data to be processed is a set of logs with a certain format, or a size of the requested data, or other attributes associated with the tenant's data, or any combination thereof. In some cases, rather than include an indication of the data structure 360 in recipe 335, master node 310 may determine the data structure 360 implicitly based on the tenant ID 340. For example, master node 310 may store a lookup table in memory containing IDs for the tenants of the multi-tenant database system and one or more corresponding data structures for each tenant. The one or more fields 365 may indicate specific fields within datasets that are relevant to the tenant's data processing request. For instance, fields 365 may indicate a set of information that the tenant would like to analyze, including, for example, revenue or sales amounts, customer information, dates, etc. In some cases, these fields may be examples of standard fields that are supported for all tenants of the system. Additionally or alternatively, fields 365 may include one or more custom fields 370 that the tenant seeks for analysis. As an example, a first custom field 370-a may indicate a first field and a second custom field 370-b may indicate a second field that are each specific to the tenant requesting the data, and may be made available for the tenant to include in recipe 335 by the provider. In some cases, these custom fields 370 may be tenant-specific (e.g., defined by a user/developer associated with the tenant). In some examples, the input information 345 may include input data for processing. For example, recipe 335 may indicate an aggregation transformation to be applied to certain fields 365 of data records in the database and a set of input data included in recipe 335. Similarly, the input information 345 may specify data to retrieve from external sources (e.g., data stores or repositories external to the multi-tenant distributed data system).

The tenant may indicate any number of transformations within transformation information 350 included in recipe 335. For example, the transformations available to the tenant may be preconfigured or predefined for all tenants, and the tenant user device 305, when generating recipe 335, may pick a transformation from the predefined set of transformations. In some cases, a provider or provider user device may send a list of available transformations to each tenant, and a user associated with the tenant may use the list when generating the recipe 335. In some cases, this list of available transformations may also specify the supported data structures, outputs, and/or input fields. In some cases, this list may be a document, while in other cases, the list may be implemented within a UI for generating recipes 335.

As an illustrative example, tenant user device 305 may include an indication that transformation 1 375-a (e.g., a first mathematical operation on two or more datasets, or an indication to join the datasets) be applied in addition to transformation 3 375-b (e.g., a second mathematical operation on the joined two or more datasets) on a dataset. In some cases, transformation information 350 may further indicate the order in which the transformations should be performed (e.g., perform transformation 1 375-a first, then perform transformation 3 375-b, or vice versa). In any case, because the transformations 375 are selected from a predefined set of available transformations, these may be known by the provider, and therefore may be recognized by code 330 when executed with the instructions from recipe 335. In some cases, the set of transformations available to a first tenant may differ from the set of transformations available to a second tenant. For example, the different transformations available for a tenant may be based on an amount of data stored for the tenant, a data structure 360 for the tenant's data, a type of security for the tenant's data (e.g., whether the data is encrypted, how the data is encrypted, etc.), a type of license purchased from the provider by the tenant, or some combination of these or other factors.

Thus, based on input information 345 and transformation information 350, recipe 335 may provide information used by code 330 to join or otherwise modify datasets, and also indicate multiple different transformations on a variety of inputs. Additionally, output information 355 may specify a particular format of the output file requested by tenant user device 305. For instance, output information 355 may indicate that the data processing results should be saved in an output table having a particular format or structure that enables tenant user device to efficiently consume the results provided by the distributed data system. As a result, the tenant may only have to indicate the data of concern, and what they want done to the data. In other words, recipe 335 may be a declarative object that describes input data, output data, and what needs to happen to the data, and the use of recipe 335 may prevent the tenant from having to develop code to be executed on the system.

As an illustrative example of tenant-specific processing instructions to be executed using code 330, the below information may be included in recipe 335 (e.g., represented as a text file) (some portions omitted for brevity):

```
"metadata": {
    "0PVXX000000005GGAQ": {
        "version": {
            "id": "0PVXX000000005GGAQ"
        },
        "schema": {
            "fields": [
                {"name": "AccountName",
                "type": "Text"},
                {"name": "StageName",
                "type": "Text"},
                {"name": "Amount",
                "type": "Decimal"},
                {"name": "CloseDate",
                "type": "Timestamp"},
                {"name": "Probability",
                "type": "Decimal"},
                {"name": "CreatedDate",
                "type": "Timestamp"},
                {"name": "MyCustomField1___c",
                "type": "Text"},
                {"name": "MyCustomField2___c",
                "type": "Text"},
                {"name": "OpportunityId",
                "type": "Text"}
```

-continued

```
            ]
        }
    }
},
"targetId": "TargetDataset",
"tenantId": "00Dxx0000001i99",
"recipe": {
    "version": "206.0.0",
    "tableModelInfo": {
        "rootDataset": {
            "name": "Opportunity",
            "fields": [
                { "name": "StageName" },
                { "name": "Amount" },
                { "name": "CloseDate" },
                { "name": "Probability" },
                { "name": "CreatedDate" },
                { "name": "AccountId" },
                { "name": "MyCustomField1___c" },
                { "name": "OpportunityId" }
            ]
        }
    },
    "publishFields": [
        { "name": "StageName" },
        { "name": "Amount" },
        { "name": "CloseDate" },
        { "name": "Probability" },
        { "name": "CreatedDate" },
        { "name": "MyCustomField1___c" },
        { "name": "MyCustomField2___c" },
        { "name": "OpportunityId" }
    ],
    "steps": [
        {" type ": " JOIN_DATASET ",
        " leftKey ": [
            { " name ": " AccountId "}
        ],
        " rightKey ": [
            {" name ": " Id. "}
        ],
        "dataset": {
            "name": "Account",
            "fields": [
                { "name": "Name" },
                { "name": "AccountId" },
                { "name": "MyCustomField2___c" },
                { "name": "Owner" }
            ]
        }
    ]
}
```

The above recipe 335 may instruct the framework of the distributed data processing system to join datasets from respective data object types or data stores (e.g., a dataset for "Opportunities" and a dataset for "Accounts," in the above example). The joined datasets may be published as a new entity that includes all fields from the respective datasets, and may be saved to a distributed data store. For instance, the new entity may include all fields from the dataset Opportunities as well as the name of the account that the dataset is associated with. The new entity also may include tenant-specific custom fields. For instance, as illustrated in the example recipe 335 above, the published entity may include MyCustomField1_c from Opportunity and MyCustomField1_c from Accounts.

Upon receiving recipe 335 from tenant user device 305, master node 310 may identify the information included within recipe 335 for processing with code 330. For example, code 330 may define an executable program 380 that may be distributed among one or more worker nodes (e.g., as described above with reference to FIG. 2) for generating a requested set of data defined by recipe 335. In some cases, executable program 380 may include at least functionality that pre-filters tenant data 385 and selects transformations 390.

As described above, the use of recipe 335 with code 330 that is developed by the provider maintains data security within a multi-tenant distributed data system in that the tenant does not have access to code 330 and therefore may not obtain data that belongs to other tenants (whether inadvertently or not). As such, the pre-filtering of tenant data 385 by executable program 380 may ensure that, for respective recipes 335 received from each tenant user device 305, only the data belonging to the respective tenants may be returned. That is, security is ensured by the provider's own code 330. In some cases, the pre-filtering of tenant data 385 may be based on tenant ID 340 included within recipe 335, included with recipe 335 in a transmission, or determined by master node 310.

Executable program 380 may also support functionality to select transformations 390 based on the transformation information 350 included in recipe 335. For instance, referring back to the above illustrative example, recipe 335 may indicate that the tenant has chosen transformation 1 375-a and transformation 3 375-b, which may have been selected from a predefined set of possible transformations 393 (e.g., including possible transformations 395-a through 395-k). In such cases, code 330 may enable the identification of possible transformation 1 395-a and possible transformation 3 395-c from the set of possible transformations 393, and may perform these transformations 395 on the requested set of data when code 330 is executed. In some cases, to execute code 330, master node 310 may input recipe 335 or portions of recipe 335 into the executable code 330 as arguments. Different methods or functions (e.g., query functions to retrieve data, math or join functions for transforming data, etc.) within code 330 may be called based on the indicated input information 345 (e.g., the data structure 360 and/or the fields 365), transformation information 350, output information 355, or a combination of these parameters specified in recipe 335.

Thus, the use of tenant-specific processing instructions and executable code 300 may provide for respective tenants to transmit processing instructions in the form of a declarative object (e.g., recipe 335). Recipe 335 may abstract the processing logic and allow the tenant-specific processing instructions to interact with a provider platform that, in turn, may use a distributed data system for computations requested by recipe 335. The provider (e.g., through a provider user device) may supply code 330 that is maintained at, for example, master node 310. The described techniques may also provide an added level of security to retrieval of tenant data in multi-tenant environments, due to the provider controlling code 330 which performs retrieval of the requested data, such that code developed by an outside organization is not executed directly on the system. In some aspects, efficient data processing techniques may be realized through dynamically processing tenant-specified processing steps and input data without having to modify or update the code that is executed for different tenants or for different requests. For instance, as described below, multiple tenants may transmit different recipes 335 to the distributed data system, and each recipe 335 may be efficiently processed by code 330 that is executed on one or more worker nodes.

Figure 4:
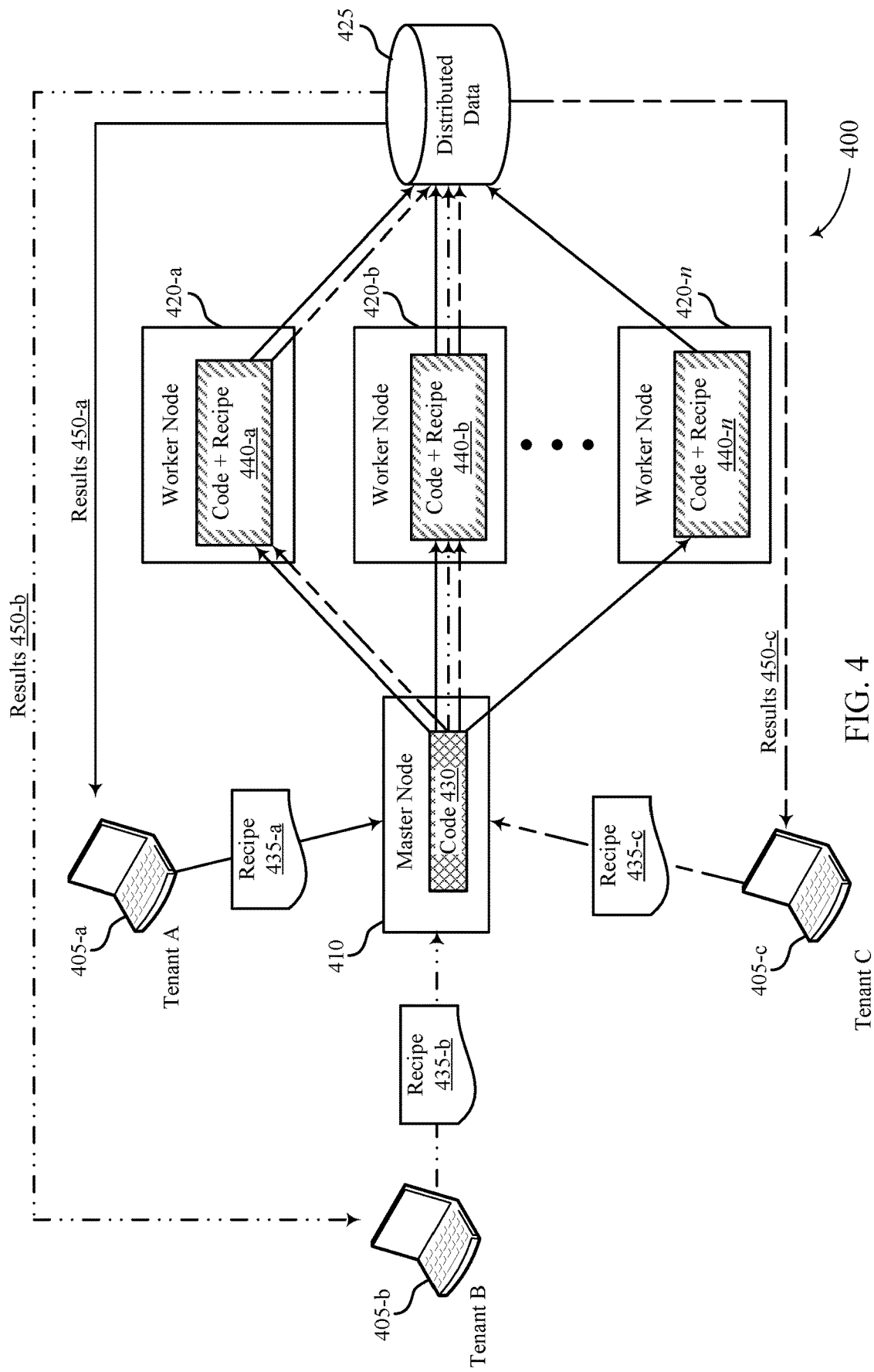
FIG. 4 illustrates an example of a distributed data system that supports distributed data processing in multi-tenant environments in accordance with aspects of the present disclosure.

FIG. 4 illustrates an example of a distributed data system 400 that supports distributed data processing in multi-tenant environments in accordance with various aspects of the present disclosure. Data processing within distributed data system 400 may be performed by multiple tenant user devices 405 and a master node 410, which may be examples of the corresponding devices described with reference to FIGS. 2-3. Additionally, master node 410 may control or direct data processing functions to be performed at one or more worker nodes 420, and distributed data system 400 may further include distributed data 425 that includes one or more databases, data stores, data lakes, or the like. Distributed data system 400 may support the use of code 430 for data processing that is based on declarative instructions (e.g., recipes 435) provided by multiple tenants, where code 430 and recipes 435 may be executed by worker nodes 420. Distributed data system 400 may support the efficient data processing for multiple tenants such that each tenant may avoid having to develop their own code for execution on distributed data system 400.

As described above, the use of a single code 430 that is capable of handling different data processing requests from respective tenants may obviate the need to create static, customized code for each tenant (and for each request). The declarative instructions included within each tenant's recipe 435 may be efficiently processed within distributed data system as the recipes may direct the system in what data to retrieve, what to do with the data, and how the processing results should be formatted. As an example, each tenant user device 405 (e.g., a first tenant user device 405-a associated with a first tenant (Tenant A), a second tenant user device 405-b associated with a second tenant (Tenant B), and so forth) may generate respective recipes (e.g., recipes 435-a through 435-c) which may be submitted to master node 410. It is noted that while only three tenant user devices and their respective recipes are depicted in FIG. 4, the multi-tenant distributed data system 400 may support any number of tenants, and similarly may handle any number of tenant-specific processing instructions transmitted per tenant, per tenant user, or per tenant user device 405.

Upon receipt of the respective recipes 435 at master node 410, master node may identify the input information, transformation information, and output information included in each recipe 435. Subsequently, master node may determine how to execute a combination of the code and recipe 440 between the different worker nodes 420. In some cases, the determination may be based on the physical location of each tenant's data storage, based on the declarative instructions included in the tenant's recipe 435, or based on the capabilities, configurations, or load on the worker nodes 420. For example, a first recipe 435-a received from first tenant user device 405-a may indicate a large number of transformations to perform on a very large dataset (e.g., millions of data records/rows). To reduce the overhead induced by this processing at each worker node 420, and/or to reduce the latency of the processing by parallelizing the jobs, master node 410 may distribute some of the processing to a first worker node 420-a, a second worker node 420-b, and an nth worker node 420-n. As such, master node 410 may transmit aggregated code and recipe instructions 440-a, 440-b, and 440-n, to the respective worker nodes to generate a requested set of data for the first tenant user device 405-a. In some cases, worker nodes 420-a, 420-b, and 420-n may be examples of separate nodes (e.g., separate servers, server clusters, virtual machines, etc.). In other cases, worker nodes 420-a, 420-b, and 420-n may be components of a same cluster (e.g., a node or server cluster).

In another example, a second tenant user device 405-b may transmit a recipe 435-b to master node 410. All or most of the data belonging to the tenant associated with the second tenant user device 405-b may be stored in a data store physically located near worker node 420-*b* (e.g., where, in some cases, worker node 420-*b* and the data store may share a wired connection). As such, master node 410 may send the code and recipe based on recipe 435-*b* and code 430 to worker node 420-*b* for processing (e.g., if worker node 420-*b* contains sufficient available resources to handle the processing).

In yet another example, a third tenant user device 405-*c* may transmit a recipe 435-*c* that includes one or more transformations that are computationally complex, and may require the utilization of a relatively high amount of system resources. Accordingly, master node 410 may determine that first worker node 420-*a* and second worker node 420-*b* are to process the aggregated code and recipe instructions 440 for third tenant user device 405-*c*, for example, based on the capabilities of worker nodes 420-*a* and 420-*b*, based on available system resources at worker nodes 420-*a* and 420-*b*, or based on a proximity of worker nodes 420-*a* and 420-*b* to distributed data 425. In any event, the aggregated code and recipe instructions 440 may be executed by one or more worker nodes 420 to generate a requested set of data for each tenant.

Because each recipe 435-*a* through 435-*c* includes or is associated with a respective tenant ID, each tenant user device 405 may only receive results 450 that include data that the respective tenants have access to. For example, master node 410 may filter the data that each tenant has access to such that Tenant A may not receive data belonging to Tenant C or Tenant B. Accordingly, results 450-*a* returned to tenant user device 405-*a* may be generated from only the data that Tenant A has access to. Thus, data security within distributed data system 400 may be maintained through the use of code 430 that is developed by the provider. In some cases, results 450 may be transmitted to a tenant user device 405 without being stored in distributed data 425 (e.g., by the worker nodes 420 or master node 410 if the data being transformed is read-only data). In other cases, the worker nodes 420 may send the results 450 to storage in the distributed data 425, and the tenant user devices 405 may query for this data. This data may overwrite some of the data retrieved for transformation, or may be stored in addition to the data retrieved for transformation.

Figure 5:
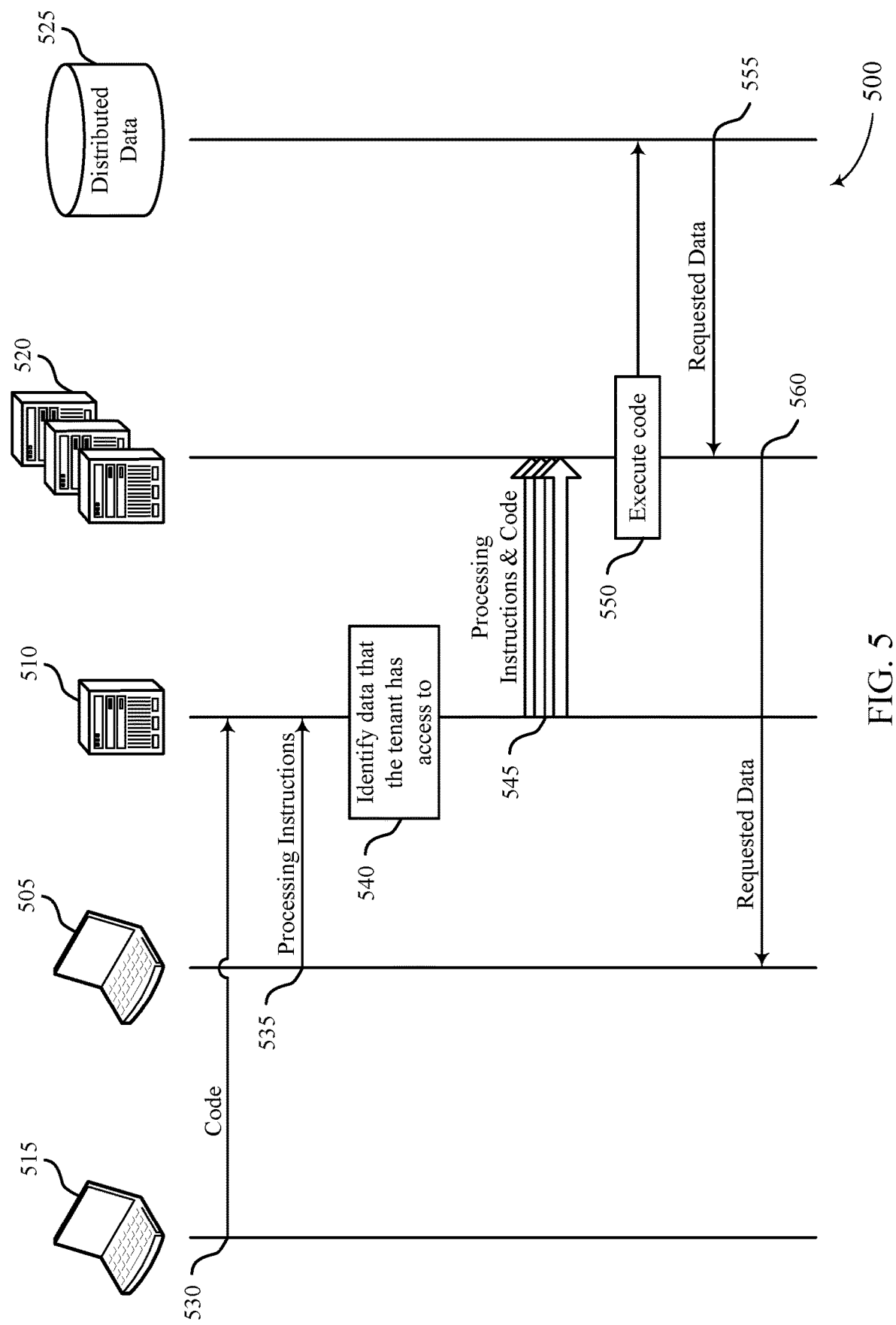
FIG. 5 illustrates an example of a process flow in a system that supports distributed data processing in multi-tenant environments in accordance with aspects of the present disclosure.

FIG. 5 illustrates an example of a process flow 500 in a system that supports distributed data processing in multi-tenant environments in accordance with various aspects of the present disclosure. Process flow 500 may include a tenant user device 505, a master node 510, a provider user device 515, worker nodes 520, and distributed data store 525. These devices may be examples of the corresponding devices described with reference to FIGS. 1 through 4. Process flow 500 may support the use of a provider-supplied code that is executed with a tenant-provided recipe for dynamic data processing within a multi-tenant distributed data system.

At 530, provider user device may provide code that is executable to process requested sets of data using tenant-specific processing instructions. In some cases, the code may be stored at master node 510, and may be used for processing instructions received from multiple tenants. For instance, the code may enable different tenants to provide a declarative request to master node 510 for processing the different tenant's data without being modified or persistently updated to account for different types or formats of data associated with different tenants.

As an example, at 535, tenant user device may transmit, and master node 510 may receive, tenant-specific processing instructions for a requested set of data. In some cases, as described above, the tenant-specific processing instructions may be referred to as a recipe, and may include input information, transformation information, and output information. The input information may indicate various data fields that the tenant seeks to analyze, which may include one or more custom fields specific to the tenant user device (or to the tenant organization) and a data structure for the requested set of data. Additionally or alternatively, the transformation information may be selected from a pre-defined set of possible transformations (e.g., a set of transformations that is configured by the provider of the multi-tenant distributed data system).

At 540, master node 510 may identify data that the tenant has access to from the multi-tenant distributed data system. The identification may be based on a tenant ID associated with the tenant user device. For example, identifying data from the multi-tenant distributed data system that the tenant has access to may include pre-filtering data that the tenant does not have access to based on the tenant ID. Additionally or alternatively, identifying the data the tenant has access to may include identifying datasets within the data that the tenant has access to based at on an indicated data structure (e.g., a format of the datasets, a size of the datasets, and/or the like). As a result, the data that the tenant has access to may be used to generate the requested set of data.

At 545, master node 510 may transmit, and one or more worker nodes 520 may receive, the tenant-specific processing instructions and the code—or a subset of the code (e.g., functions or methods applicable to the tenant-specific processing instructions)—received from the provider user device to generate the requested set of data. In such cases, the tenant-specific processing instructions and the code received from the provider user device may be provided to worker nodes 520 for execution on the data that the tenant has access to within the multi-tenant distributed data system. For instance, worker nodes 520 may execute the code and the recipe at 550, and may subsequently retrieve data from distributed data store 525. In some cases, this retrieval process may involve querying the distributed data store 525 for the data.

Upon receiving the requested data at 555, worker nodes 520 may further perform a number of transformations on the data. For example, performing the transformations on the data may include transforming two or more datasets from the data that the tenant has access to using a set of transformations from the pre-defined set of possible transformations in accordance with the transformation information, where the generated requested set of data comprises the transformed two or more datasets. In some cases, generating the requested set of data may include generating the requested set of data by aggregating two or more datasets from the data that the tenant has access to, where the generated requested set of data includes, for example, fields from the aggregate two or more datasets and the one or more custom fields specific to the tenant user device. In some examples, the two or more data sets are from respective data stores within the multi-tenant distributed data system.

At 560, the generated requested set of data may be transmitted to tenant user device 505. For example, the transmission of the requested set of data may be performed by master node 510, or by worker nodes 520, or any combination thereof. In other cases, tenant user device 505 may retrieve the generated requested set of data by accessing distributed data store 525 (e.g., if the output set of data is stored in the distributed data store 525 following the processing at the worker nodes 520).

Figure 6:
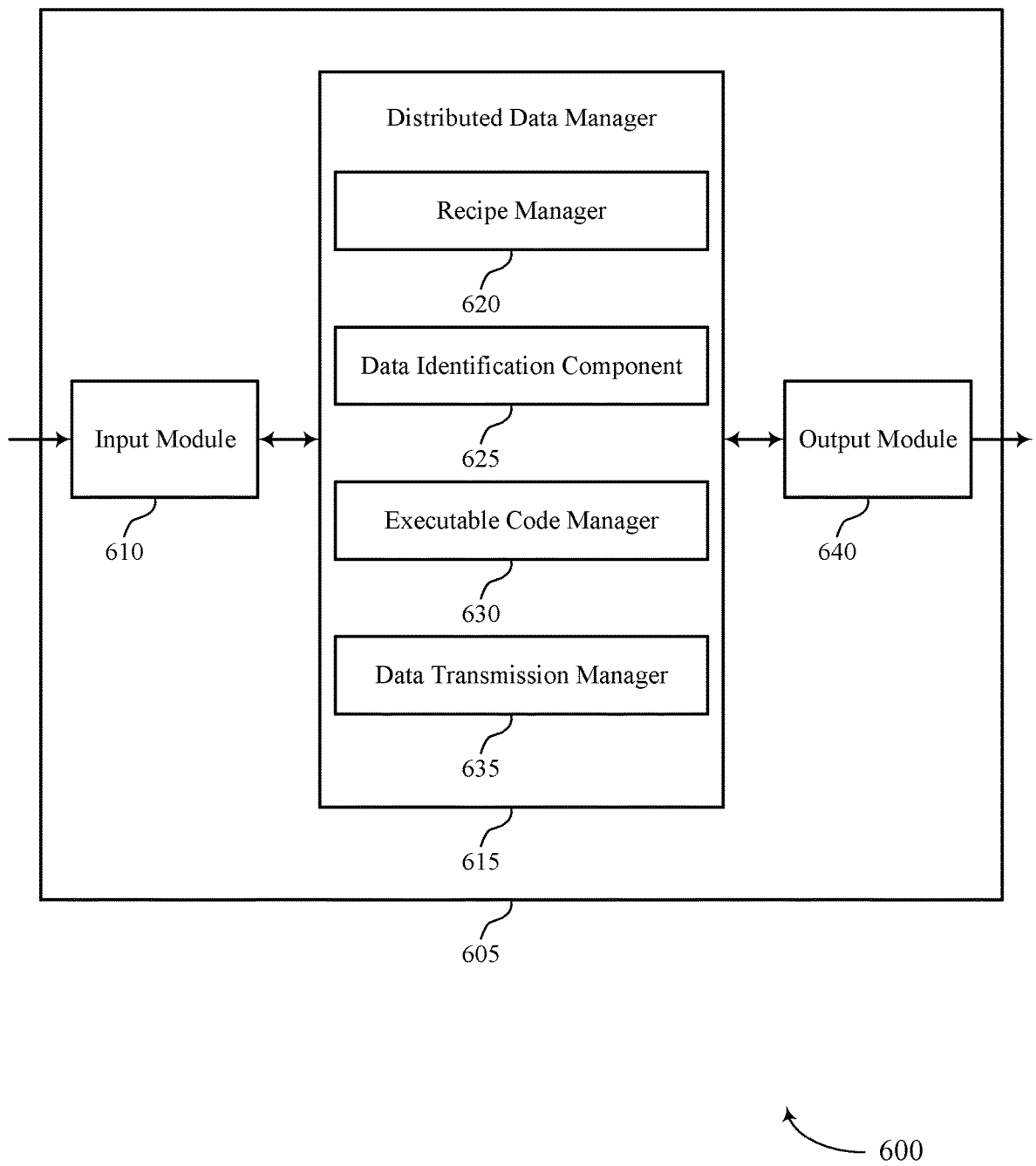
FIG. 6 shows a block diagram of an apparatus that supports distributed data processing in multi-tenant environments in accordance with aspects of the present disclosure.

FIG. 6 shows a block diagram 600 of a device 605 that supports distributed data processing in multi-tenant environments in accordance with aspects of the present disclosure. The device 605 may include an input module 610, a distributed data manager 615, and an output module 640. The device 605 may also include a processor. Each of these components may be in communication with one another (e.g., via one or more buses). In some cases, the device 605 may be an example of a master node or a worker node as described above with reference to FIGS. 2-5.

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the distributed data manager 615 to support distributed data processing in multi-tenant environments. In some cases, the input module 610 may be a component of an input/output (I/O) controller 815 as described with reference to FIG. 8.

The distributed data manager 615 may include a recipe manager 620, a data identification component 625, an executable code manager 630, and a data transmission manager 635. The distributed data manager 615 may be an example of aspects of the distributed data manager 810 described herein.

The recipe manager 620 may receive, from a tenant user device, tenant-specific processing instructions for a requested set of data, the tenant-specific processing instructions including input information, transformation information, and output information, where the input information includes one or more custom fields specific to the tenant user device and a data structure for the requested set of data, and where the transformation information is from a pre-defined set of possible transformations. The data identification component 625 may identify, from the multi-tenant distributed data system, data that the tenant has access to based on a tenant ID associated with the tenant user device, where the data that the tenant has access to is used to generate the requested set of data.

The executable code manager 630 may receive, from a provider user device, code that is executable to process the requested set of data using the tenant-specific processing instructions and transmit, for execution by a set of worker nodes on the data that the tenant has access to within the multi-tenant distributed data system, the tenant-specific processing instructions and the code received from the provider user device to generate the requested set of data. The data transmission manager 635 may transmit, to the tenant user device, the generated requested set of data.

The output module 640 may manage output signals for the device 605. For example, the output module 640 may receive signals from other components of the device 605, such as the distributed data manager 615, and may transmit these signals to other components or devices. In some specific examples, the output module 640 may transmit output signals for display in a user interface, for storage in a database or data store, for further processing at a server or server cluster, or for any other processes at any number of devices or systems. In some cases, the output module 640 may be a component of an I/O controller 815 as described with reference to FIG. 8.

Figure 7:
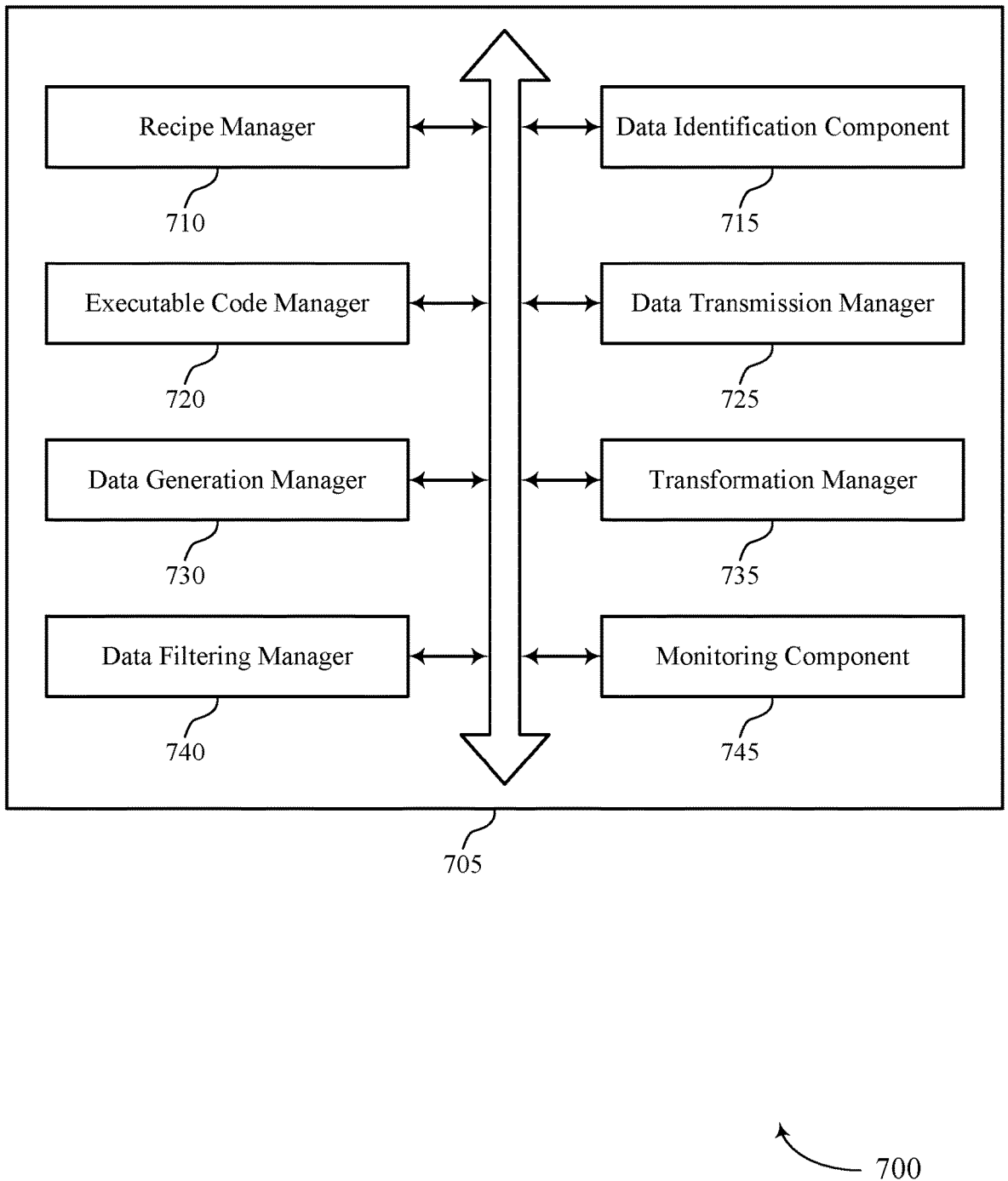
FIG. 7 shows a block diagram of a distributed data manager that supports distributed data processing in multi-tenant environments in accordance with aspects of the present disclosure.

FIG. 7 shows a block diagram 700 of a distributed data manager 705 that supports distributed data processing in multi-tenant environments in accordance with aspects of the present disclosure. The distributed data manager 705 may be an example of aspects of a distributed data manager 615 or a distributed data manager 810 described herein. The distributed data manager 705 may include a recipe manager 710, a data identification component 715, an executable code manager 720, a data transmission manager 725, a data generation manager 730, a transformation manager 735, a data filtering manager 740, and a monitoring component 745. Each of these modules may communicate, directly or indirectly, with one another (e.g., via one or more buses).

The recipe manager 710 may receive, from a tenant user device, tenant-specific processing instructions for a requested set of data, the tenant-specific processing instructions including input information, transformation information, and output information, where the input information includes one or more custom fields specific to the tenant user device and a data structure for the requested set of data, and where the transformation information is from a pre-defined set of possible transformations. In some cases, the input information describes one or more input data tables and the output information describes one or more results data tables. In some cases, the tenant-specific processing instructions include a declarative object formatted in accordance with a programming language.

The data identification component 715 may identify, from the multi-tenant distributed data system, data that the tenant has access to based on a tenant ID associated with the tenant user device, where the data that the tenant has access to is used to generate the requested set of data. In some examples, identifying data from the multi-tenant distributed data system that the tenant has access to includes identifying datasets within the data that the tenant has access to based on the data structure, where the data structure includes a format of the datasets, or a size of the datasets, or a combination thereof.

The executable code manager 720 may receive, from a provider user device, code that is executable to process the requested set of data using the tenant-specific processing instructions. In some examples, the executable code manager 720 may transmit, for execution by a set of worker nodes on the data that the tenant has access to within the multi-tenant distributed data system, the tenant-specific processing instructions and the code received from the provider user device to generate the requested set of data. In some cases, the code received from the provider user device includes executable code written to perform data processing and using a programming language.

The data transmission manager 725 may transmit, to the tenant user device, the generated requested set of data. The data generation manager 730 may generate, in accordance with the tenant-specific processing instructions and the code received from the provider user device, the requested set of data by aggregating two or more datasets from the data that the tenant has access to, where the generated requested set of data includes fields from the aggregate two or more datasets and the one or more custom fields specific to the tenant user device. In some cases, the two or more data sets are from respective data stores within the multi-tenant distributed data system.

The transformation manager 735 may transform two or more datasets from the data that the tenant has access to using a set of transformations from the pre-defined set of possible transformations in accordance with the transformation information, where the generated requested set of data includes the transformed two or more datasets. The data filtering manager 740 may pre-filter data that the tenant does not have access to based on the tenant ID. The monitoring component 745 may monitor execution of the tenant-specific processing instructions and the code received from the provider user device execution by the set of worker nodes.

Figure 8:
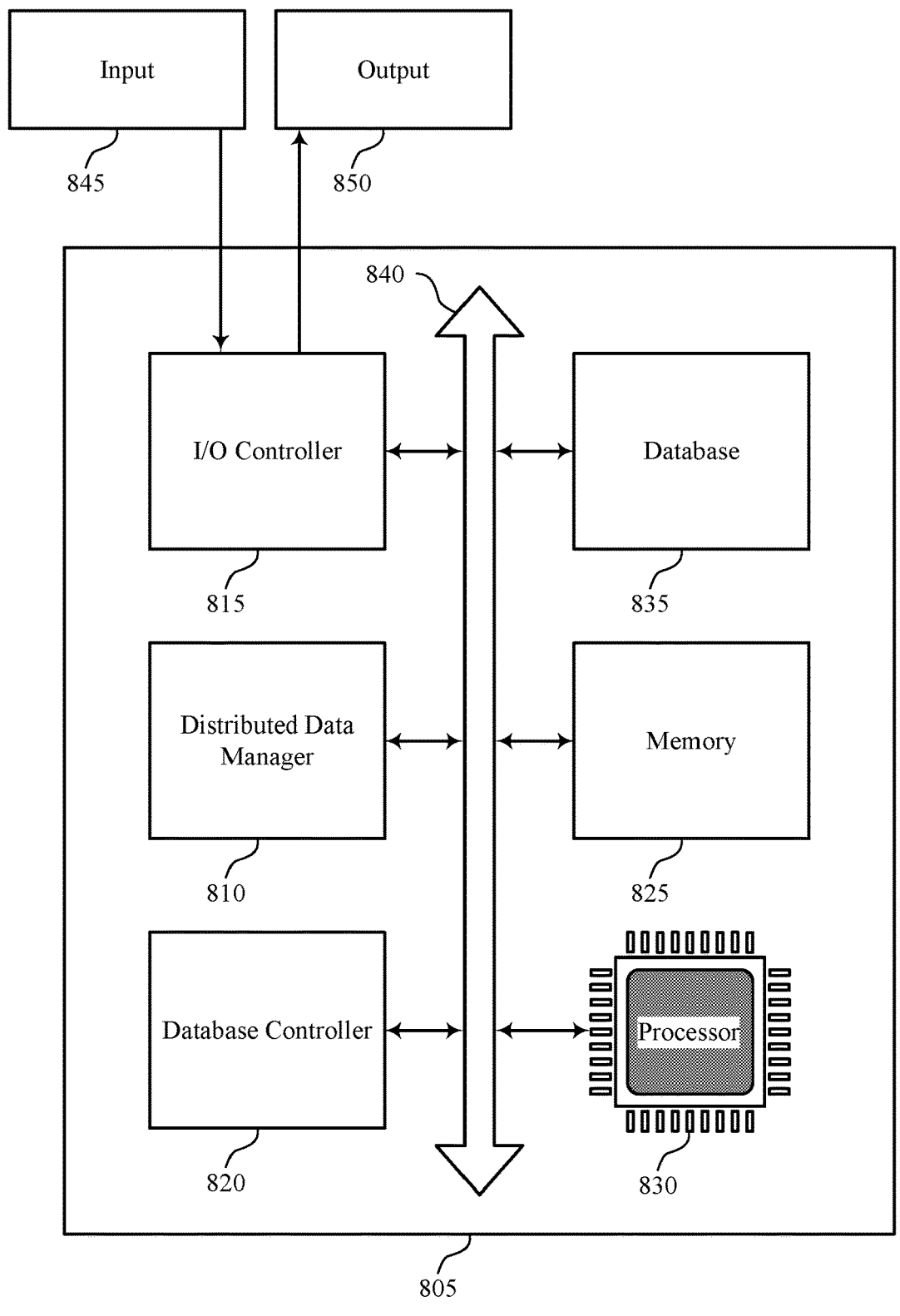
FIG. 8 shows a diagram of a system including a device that supports distributed data processing in multi-tenant environments in accordance with aspects of the present disclosure.

FIG. 8 shows a diagram of a system 800 including a device 805 that supports distributed data processing in multi-tenant environments in accordance with aspects of the present disclosure. The device 805 may be an example of or include the components of device 605 as described herein. The device 805 may include components for bi-directional voice and data communications including components for transmitting and receiving communications, including a distributed data manager 810, an I/O controller 815, a database controller 820, memory 825, a processor 830, and a database 835. These components may be in electronic communication via one or more buses (e.g., bus 840).

The distributed data manager 810 may receive, from a tenant user device, tenant-specific processing instructions for a requested set of data, the tenant-specific processing instructions including input information, transformation information, and output information. In some cases, the input information may include one or more custom fields specific to the tenant user device and a data structure for the requested set of data, and the transformation information may be from a pre-defined set of possible transformations. In some cases, the distributed data manager 810 may identify, from the multi-tenant distributed data system, data that the tenant has access to based on a tenant ID associated with the tenant user device, where the data that the tenant has access to is used to generate the requested set of data. In some cases, the distributed data manager 810 may receive, from a provider user device, code that is executable to process the requested set of data using the tenant-specific processing instructions. The distributed data manager 810 may also transmit, for execution by a set of worker nodes on the data that the tenant has access to within the multi-tenant distributed data system, the tenant-specific processing instructions and the code received from the provider user device to generate the requested set of data, and transmit, to the tenant user device, the generated requested set of data.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, a field programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting distributed data processing in multi-tenant environments).

Figure 9:
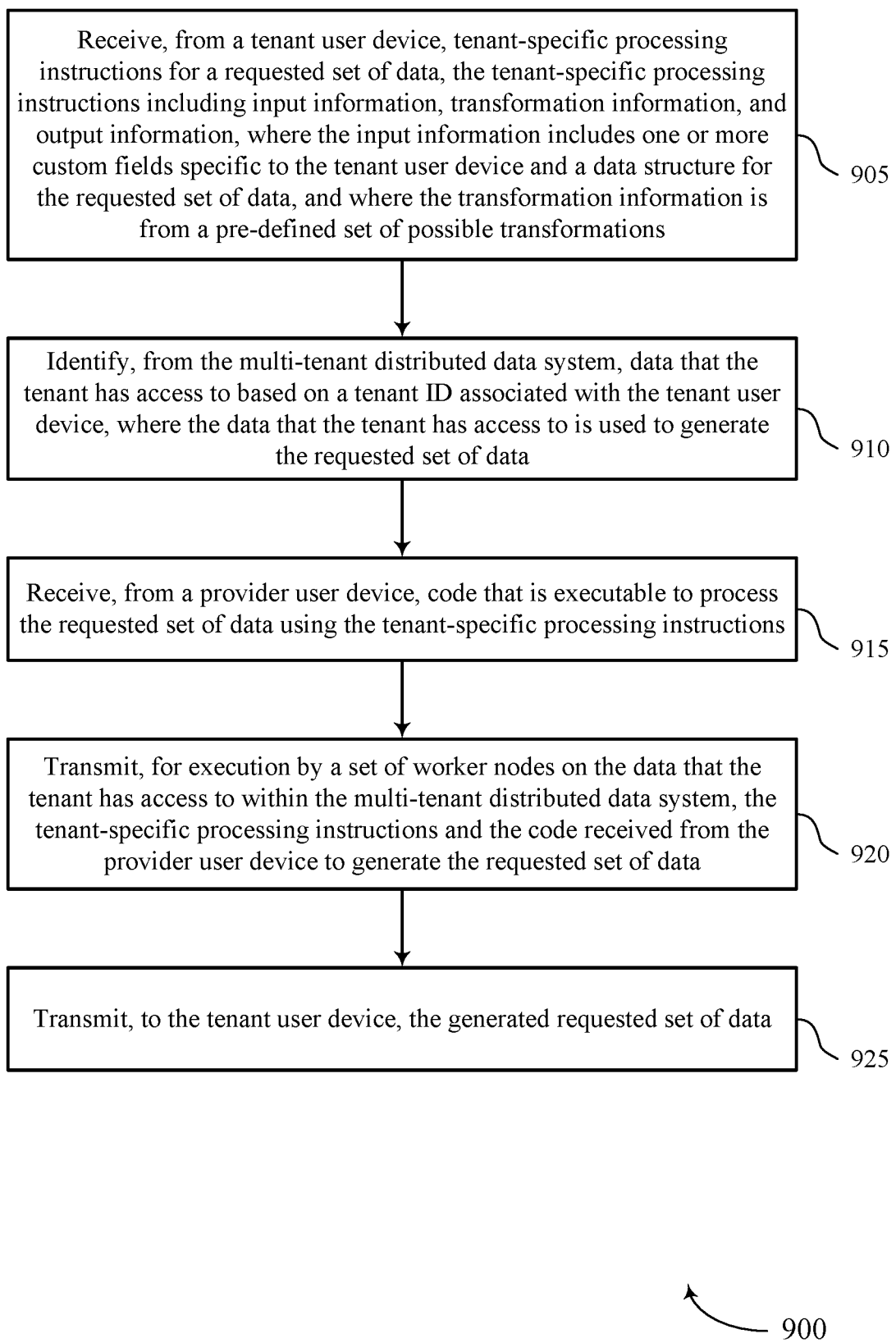
FIGS. 9 through 12 show flowcharts illustrating methods that support distributed data processing in multi-tenant environments in accordance with aspects of the present disclosure.

FIG. 9 shows a flowchart illustrating a method 900 that supports distributed data processing in multi-tenant environments in accordance with aspects of the present disclosure. The operations of method 900 may be implemented by a master node or its components as described herein. For example, the operations of method 900 may be performed by a distributed data manager as described with reference to FIGS. 6 through 8. In some cases, the operations of method 900 may be performed by various components or devices within a distributed data processing system. For instance, aspects of method 900 may be performed by nodes or devices other than the master node, such as one or more worker nodes within the distributed data system (e.g., operating based on instructions distributed by the master node). In some examples, a master node or the set of worker nodes may execute a set of instructions to control the functional elements of the master node or worker nodes to perform the functions described below. Additionally or alternatively, a master node or the set of worker nodes may perform aspects of the functions described below using special-purpose hardware.

At 905, the master node may receive, from a tenant user device, tenant-specific processing instructions for a requested set of data, the tenant-specific processing instructions including input information, transformation information, and output information, where the input information includes one or more custom fields specific to the tenant user device and a data structure for the requested set of data, and where the transformation information is from a pre-defined set of possible transformations. The operations of 905 may be performed according to the methods described herein. In some examples, aspects of the operations of 905 may be performed by a recipe manager as described with reference to FIGS. 6 through 8.

At 910, the master node may identify, from the multi-tenant distributed data system, data that the tenant has access to based on a tenant identity (ID) associated with the tenant user device, where the data that the tenant has access to is used to generate the requested set of data. The operations of 910 may be performed according to the methods described herein. In some examples, aspects of the operations of 910 may be performed by a data identification component as described with reference to FIGS. 6 through 8.

At 915, the master node may receive, from a provider user device, code that is executable to process the requested set of data using the tenant-specific processing instructions. The operations of 915 may be performed according to the methods described herein. In some examples, aspects of the operations of 915 may be performed by an executable code manager as described with reference to FIGS. 6 through 8.

At 920, the master node may transmit, for execution by a set of worker nodes on the data that the tenant has access to within the multi-tenant distributed data system, the tenant-specific processing instructions and the code received from the provider user device to generate the requested set of data. The operations of 920 may be performed according to the methods described herein. In some examples, aspects of the operations of 920 may be performed by an executable code manager as described with reference to FIGS. 6 through 8.

At 925, the master node may transmit, to the tenant user device, the generated requested set of data. The operations of 925 may be performed according to the methods described herein. In some examples, aspects of the operations of 925 may be performed by a data transmission manager as described with reference to FIGS. 6 through 8.

Figure 10:
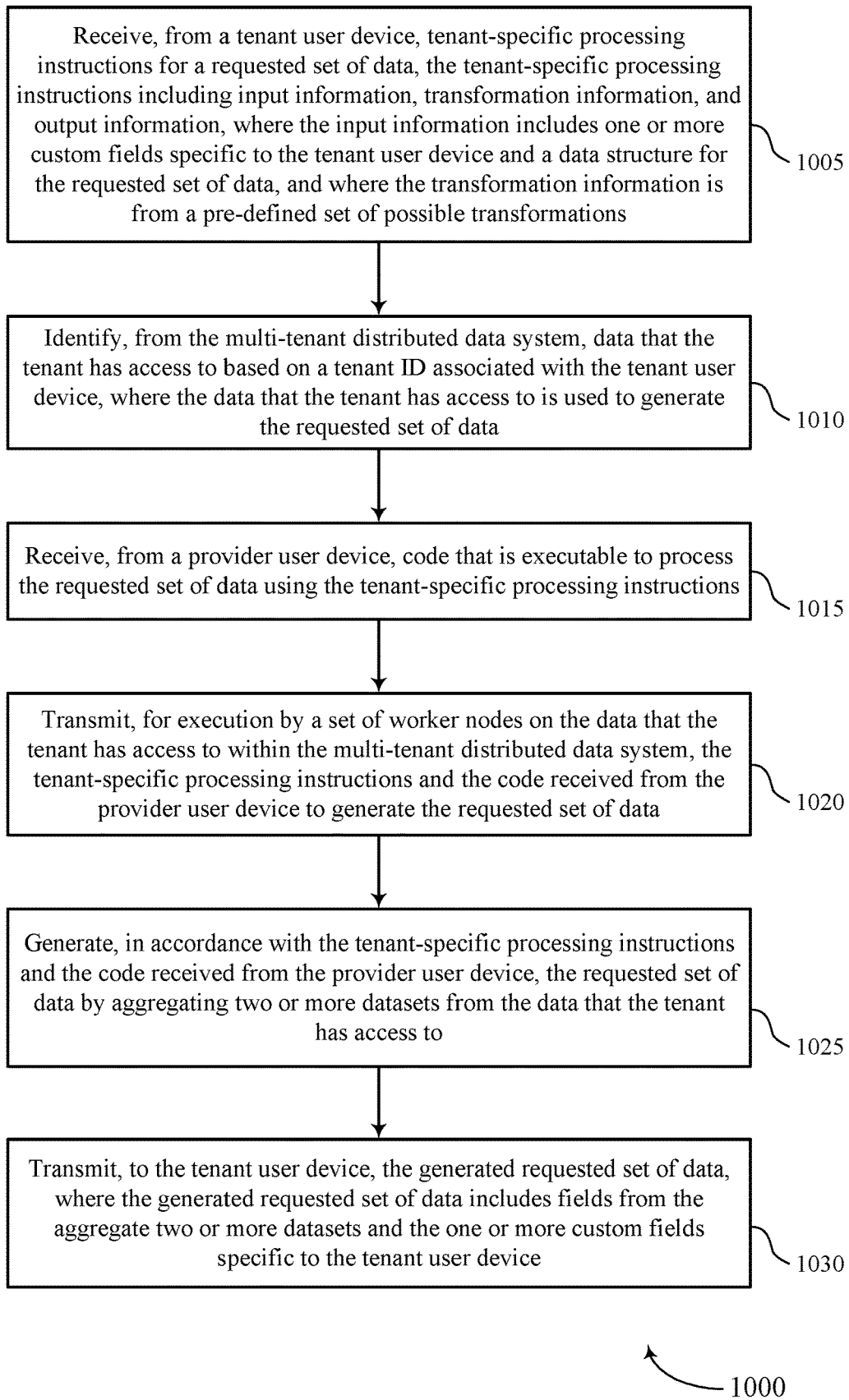

FIG. 10 shows a flowchart illustrating a method 1000 that supports distributed data processing in multi-tenant environments in accordance with aspects of the present disclosure. The operations of method 1000 may be implemented by a master node or its components as described herein. For example, the operations of method 1000 may be performed by a distributed data manager as described with reference to FIGS. 6 through 8. Additionally or alternatively, the operations of method 1000 may be performed by various components or devices within a distributed data processing system. As an example, some of the aspects of method 1000 may be performed by nodes or devices other than the master node, such as one or more worker nodes within the distributed data system (e.g., operating based on instructions distributed by the master node). In some examples, a master node or the set of worker nodes may execute a set of instructions to control the functional elements of the master node or worker nodes to perform the functions described below. Additionally or alternatively, a master node or the set of worker nodes may perform aspects of the functions described below using special-purpose hardware.

At 1005, the master node may receive, from a tenant user device, tenant-specific processing instructions for a requested set of data, the tenant-specific processing instructions including input information, transformation information, and output information, where the input information includes one or more custom fields specific to the tenant user device and a data structure for the requested set of data, and where the transformation information is from a pre-defined set of possible transformations. The operations of 1005 may be performed according to the methods described herein. In some examples, aspects of the operations of 1005 may be performed by a recipe manager as described with reference to FIGS. 6 through 8.

At 1010, the master node may identify, from the multi-tenant distributed data system, data that the tenant has access to based on a tenant identity (ID) associated with the tenant user device, where the data that the tenant has access to is used to generate the requested set of data. The operations of 1010 may be performed according to the methods described herein. In some examples, aspects of the operations of 1010 may be performed by a data identification component as described with reference to FIGS. 6 through 8.

At 1015, the master node may receive, from a provider user device, code that is executable to process the requested set of data using the tenant-specific processing instructions. The operations of 1015 may be performed according to the methods described herein. In some examples, aspects of the operations of 1015 may be performed by an executable code manager as described with reference to FIGS. 6 through 8.

At 1020, the master node may transmit, for execution by a set of worker nodes on the data that the tenant has access to within the multi-tenant distributed data system, the tenant-specific processing instructions and the code received from the provider user device to generate the requested set of data. The operations of 1020 may be performed according to the methods described herein. In some examples, aspects of the operations of 1020 may be performed by an executable code manager as described with reference to FIGS. 6 through 8.

At 1025, the master node or the set of worker nodes may generate, in accordance with the tenant-specific processing instructions and the code received from the provider user device, the requested set of data by aggregating two or more datasets from the data that the tenant has access to. The operations of 1025 may be performed according to the methods described herein. In some examples, aspects of the operations of 1025 may be performed by a data generation manager as described with reference to FIGS. 6 through 8.

At 1030, the master node or the set of worker nodes may transmit, to the tenant user device, the generated requested set of data, where the generated requested set of data includes fields from the aggregate two or more datasets and the one or more custom fields specific to the tenant user device. The operations of 1030 may be performed according to the methods described herein. In some examples, aspects of the operations of 1030 may be performed by a data transmission manager as described with reference to FIGS. 6 through 8.

Figure 11:
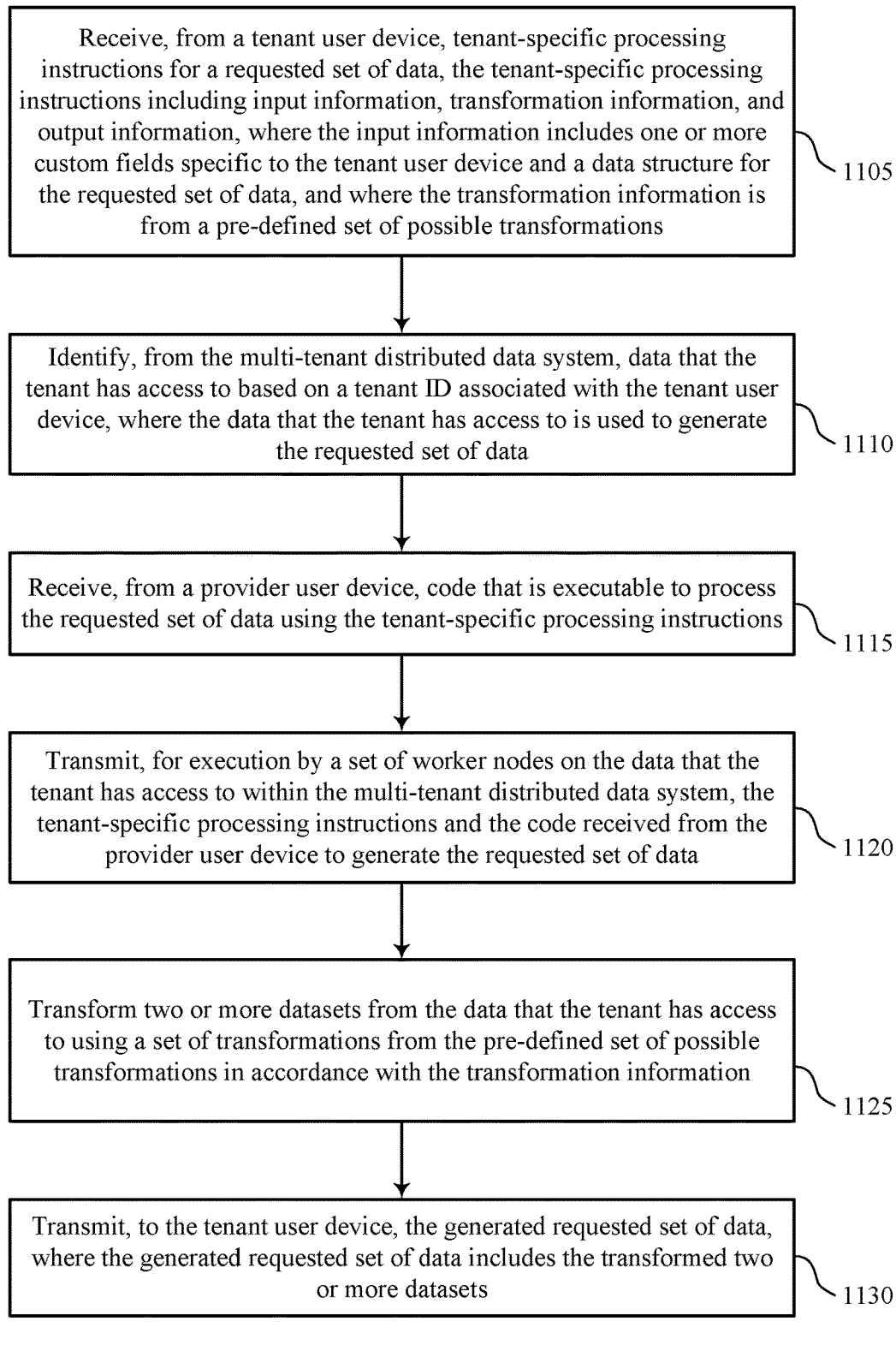

FIG. 11 shows a flowchart illustrating a method 1100 that supports distributed data processing in multi-tenant environments in accordance with aspects of the present disclosure. The operations of method 1100 may be implemented by a master node or its components as described herein. For example, the operations of method 1100 may be performed by a distributed data manager as described with reference to FIGS. 6 through 8. In some cases, the operations of method 1100 may be performed by various components or devices within a distributed data processing system. As an example, some of the aspects of method 1100 may be performed by nodes within the distributed data system other than the master node, such as a set of worker nodes (e.g., operating based on instructions received from the master node). In some examples, a master node or the set of worker nodes may execute a set of instructions to control the functional elements of the master node or worker nodes to perform the functions described below. Additionally or alternatively, a master node or the set of worker nodes may perform aspects of the functions described below using special-purpose hardware.

At 1105, the master node may receive, from a tenant user device, tenant-specific processing instructions for a requested set of data, the tenant-specific processing instructions including input information, transformation information, and output information, where the input information includes one or more custom fields specific to the tenant user device and a data structure for the requested set of data, and where the transformation information is from a pre-defined set of possible transformations. The operations of 1105 may be performed according to the methods described herein. In some examples, aspects of the operations of 1105 may be performed by a recipe manager as described with reference to FIGS. 6 through 8.

At 1110, the master node may identify, from the multi-tenant distributed data system, data that the tenant has access to based on a tenant identity (ID) associated with the tenant user device, where the data that the tenant has access to is used to generate the requested set of data. The operations of 1110 may be performed according to the methods described herein. In some examples, aspects of the operations of 1110 may be performed by a data identification component as described with reference to FIGS. 6 through 8.

At 1115, the master node may receive, from a provider user device, code that is executable to process the requested set of data using the tenant-specific processing instructions. The operations of 1115 may be performed according to the methods described herein. In some examples, aspects of the operations of 1115 may be performed by an executable code manager as described with reference to FIGS. 6 through 8.

At 1120, the master node may transmit, for execution by a set of worker nodes on the data that the tenant has access to within the multi-tenant distributed data system, the tenant-specific processing instructions and the code received from the provider user device to generate the requested set of data. The operations of 1120 may be performed according to the methods described herein. In some examples, aspects of the operations of 1120 may be performed by an executable code manager as described with reference to FIGS. 6 through 8.

At 1125, the master node or a the set of worker nodes may transform two or more datasets from the data that the tenant has access to using a set of transformations from the pre-defined set of possible transformations in accordance with the transformation information. The operations of 1125 may be performed according to the methods described herein. In some examples, aspects of the operations of 1125 may be performed by a transformation manager as described with reference to FIGS. 6 through 8.

At 1130, the master node or the set of worker nodes may transmit, to the tenant user device, the generated requested set of data, where the generated requested set of data includes the transformed two or more datasets. The operations of 1130 may be performed according to the methods described herein. In some examples, aspects of the operations of 1130 may be performed by a data transmission manager as described with reference to FIGS. 6 through 8.

Figure 12:
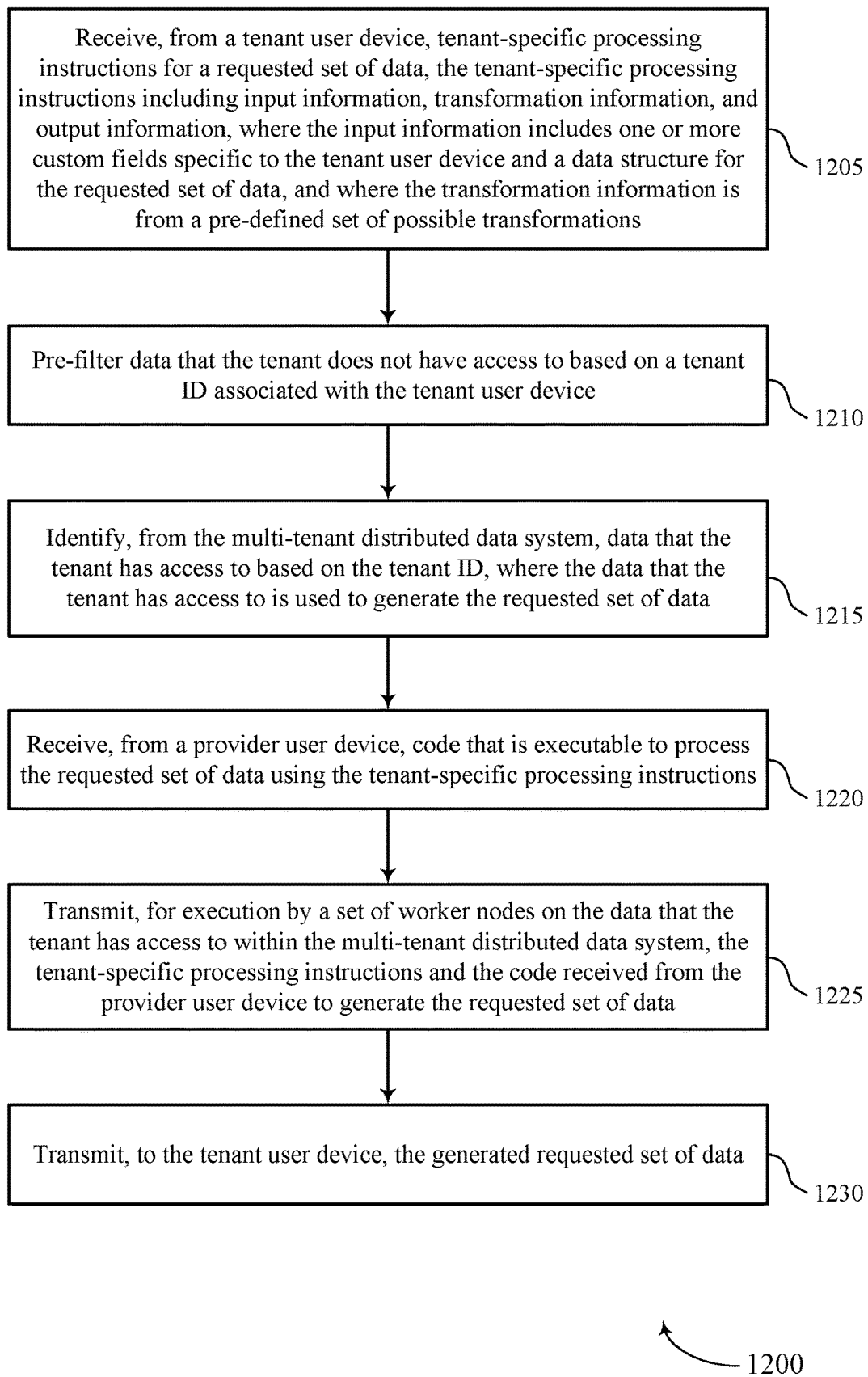

FIG. 12 shows a flowchart illustrating a method 1200 that supports distributed data processing in multi-tenant environments in accordance with aspects of the present disclosure. The operations of method 1200 may be implemented by a master node or its components as described herein. For example, the operations of method 1200 may be performed by a distributed data manager as described with reference to FIGS. 6 through 8. Additionally or alternatively, the operations of method 1200 may be performed by various components or devices within a distributed data processing system. As an example, some of the aspects of method 1200 may be performed by nodes other than the master node, such as a set of worker nodes (e.g., operating based on instructions received from the master node). In some examples, a master node or the set of worker nodes may execute a set of instructions to control the functional elements of the master node or worker nodes to perform the functions described below. Additionally or alternatively, a master node or the set of worker nodes may perform aspects of the functions described below using special-purpose hardware.

At 1205, the master node may receive, from a tenant user device, tenant-specific processing instructions for a requested set of data, the tenant-specific processing instructions including input information, transformation information, and output information, where the input information includes one or more custom fields specific to the tenant user device and a data structure for the requested set of data, and where the transformation information is from a pre-defined set of possible transformations. The operations of 1205 may be performed according to the methods described herein. In some examples, aspects of the operations of 1205 may be performed by a recipe manager as described with reference to FIGS. 6 through 8.

At 1210, the master node may pre-filter data that the tenant does not have access to based on a tenant ID associated with the tenant user device. The operations of 1210 may be performed according to the methods described herein. In some examples, aspects of the operations of 1210 may be performed by a data filtering manager as described with reference to FIGS. 6 through 8.

At 1215, the master node may identify, from the multi-tenant distributed data system, data that the tenant has access to based on the tenant ID, where the data that the tenant has access to is used to generate the requested set of data. The operations of 1215 may be performed according to the methods described herein. In some examples, aspects of the operations of 1215 may be performed by a data identification component as described with reference to FIGS. 6 through 8.

At 1220, the master node may receive, from a provider user device, code that is executable to process the requested set of data using the tenant-specific processing instructions. The operations of 1220 may be performed according to the methods described herein. In some examples, aspects of the operations of 1220 may be performed by an executable code manager as described with reference to FIGS. 6 through 8.

At 1225, the master node may transmit, for execution by a set of worker nodes on the data that the tenant has access to within the multi-tenant distributed data system, the tenant-specific processing instructions and the code received from the provider user device to generate the requested set of data. The operations of 1225 may be performed according to the methods described herein. In some examples, aspects of the operations of 1225 may be performed by an executable code manager as described with reference to FIGS. 6 through 8.

At 1230, the master node or the set of worker nodes may transmit, to the tenant user device, the generated requested set of data. The operations of 1230 may be performed according to the methods described herein. In some examples, aspects of the operations of 1230 may be performed by a data transmission manager as described with reference to FIGS. 6 through 8.

A method of data processing within a multi-tenant distributed data system is described. The method may include receiving, from a tenant user device, tenant-specific processing instructions for a requested set of data, the tenant-specific processing instructions including input information, transformation information, and output information, where the input information includes one or more custom fields specific to the tenant user device and a data structure for the requested set of data, and where the transformation information is from a pre-defined set of possible transformations, identifying, from the multi-tenant distributed data system, data that the tenant has access to based on a tenant identity (ID) associated with the tenant user device, where the data that the tenant has access to is used to generate the requested set of data, receiving, from a provider user device, code that is executable to process the requested set of data using the tenant-specific processing instructions, transmitting, for execution by a set of worker nodes on the data that the tenant has access to within the multi-tenant distributed data system, the tenant-specific processing instructions and the code received from the provider user device to generate the requested set of data, and transmitting, to the tenant user device, the generated requested set of data.

An apparatus for data processing within a multi-tenant distributed data system is described. The apparatus may include a processor, memory in electronic communication with the processor, and instructions stored in the memory. The instructions may be executable by the processor to cause the apparatus to receive, from a tenant user device, tenant-specific processing instructions for a requested set of data, the tenant-specific processing instructions including input information, transformation information, and output information, where the input information includes one or more custom fields specific to the tenant user device and a data structure for the requested set of data, and where the transformation information is from a pre-defined set of possible transformations, identify, from the multi-tenant distributed data system, data that the tenant has access to based on a tenant identity (ID) associated with the tenant user device, where the data that the tenant has access to is used to generate the requested set of data, receive, from a provider user device, code that is executable to process the requested set of data using the tenant-specific processing instructions, transmit, for execution by a set of worker nodes on the data that the tenant has access to within the multi-tenant distributed data system, the tenant-specific processing instructions and the code received from the provider user device to generate the requested set of data, and transmit, to the tenant user device, the generated requested set of data.

Another apparatus for data processing within a multi-tenant distributed data system is described. The apparatus may include means for receiving, from a tenant user device, tenant-specific processing instructions for a requested set of data, the tenant-specific processing instructions including input information, transformation information, and output information, where the input information includes one or more custom fields specific to the tenant user device and a data structure for the requested set of data, and where the transformation information is from a pre-defined set of possible transformations, identifying, from the multi-tenant distributed data system, data that the tenant has access to based on a tenant identity (ID) associated with the tenant user device, where the data that the tenant has access to is used to generate the requested set of data, receiving, from a provider user device, code that is executable to process the requested set of data using the tenant-specific processing instructions, transmitting, for execution by a set of worker nodes on the data that the tenant has access to within the multi-tenant distributed data system, the tenant-specific processing instructions and the code received from the provider user device to generate the requested set of data, and transmitting, to the tenant user device, the generated requested set of data.

A non-transitory computer-readable medium storing code for data processing within a multi-tenant distributed data system is described. The code may include instructions executable by a processor to receive, from a tenant user device, tenant-specific processing instructions for a requested set of data, the tenant-specific processing instructions including input information, transformation information, and output information, where the input information includes one or more custom fields specific to the tenant user device and a data structure for the requested set of data, and where the transformation information is from a pre-defined set of possible transformations, identify, from the multi-tenant distributed data system, data that the tenant has access to based on a tenant identity (ID) associated with the tenant user device, where the data that the tenant has access to is used to generate the requested set of data, receive, from a provider user device, code that is executable to process the requested set of data using the tenant-specific processing instructions, transmit, for execution by a set of worker nodes on the data that the tenant has access to within the multi-tenant distributed data system, the tenant-specific processing instructions and the code received from the provider user device to generate the requested set of data, and transmit, to the tenant user device, the generated requested set of data.

Some examples of the method, apparatuses, and non-transitory computer-readable medium described herein may further include operations, features, means, or instructions for generating, in accordance with the tenant-specific processing instructions and the code received from the provider user device, the requested set of data by aggregating two or more datasets from the data that the tenant may have access to, where the generated requested set of data includes fields from the aggregate two or more datasets and the one or more custom fields specific to the tenant user device.

In some examples of the method, apparatuses, and non-transitory computer-readable medium described herein, the two or more data sets may be from respective data stores within the multi-tenant distributed data system.

Some examples of the method, apparatuses, and non-transitory computer-readable medium described herein may further include operations, features, means, or instructions for transforming two or more datasets from the data that the tenant may have access to using a set of transformations from the pre-defined set of possible transformations in accordance with the transformation information, where the generated requested set of data includes the transformed two or more datasets.

In some examples of the method, apparatuses, and non-transitory computer-readable medium described herein, identifying data from the multi-tenant distributed data system that the tenant may have access to may include operations, features, means, or instructions for pre-filtering data that the tenant does not may have access to based on the tenant ID.

In some examples of the method, apparatuses, and non-transitory computer-readable medium described herein, identifying data from the multi-tenant distributed data system that the tenant may have access to may include operations, features, means, or instructions for identifying datasets within the data that the tenant may have access to based on the data structure, where the data structure includes a format of the datasets, or a size of the datasets, or a combination thereof.

Some examples of the method, apparatuses, and non-transitory computer-readable medium described herein may further include operations, features, means, or instructions for monitoring execution of the tenant-specific processing instructions and the code received from the provider user device execution by the set of worker nodes.

In some examples of the method, apparatuses, and non-transitory computer-readable medium described herein, the input information describes one or more input data tables and the output information describes one or more results data tables.

In some examples of the method, apparatuses, and non-transitory computer-readable medium described herein, the tenant-specific processing instructions include a declarative object formatted in accordance with a programming language.

In some examples of the method, apparatuses, and non-transitory computer-readable medium described herein, the code received from the provider user device includes executable code written to perform data processing and using a programming language.

It should be noted that the methods described above describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing within a multi-tenant distributed data system, comprising:
receiving, from a tenant user device, tenant-specific processing instructions for a requested set of data, the tenant-specific processing instructions comprising input information, transformation information, and output information, wherein the input information comprises one or more custom fields specific to the tenant user device and a data structure for the requested set of data, and wherein the transformation information is from a pre-defined set of possible transformations;

identifying, from the multi-tenant distributed data system, data that the tenant has access to based at least in part on a tenant identity (ID) associated with the tenant user device, wherein the data that the tenant has access to is used to generate the requested set of data;

receiving, from a provider user device, code that is executable to process the requested set of data using the tenant-specific processing instructions;

transmitting, for execution by a plurality of worker nodes on the data that the tenant has access to within the multi-tenant distributed data system, the tenant-specific processing instructions and the code received from the provider user device to generate the requested set of data; and transmitting, to the tenant user device, the generated requested set of data.

2. The method of claim 1, further comprising:
generating, in accordance with the tenant-specific processing instructions and the code received from the provider user device, the requested set of data by aggregating two or more datasets from the data that the tenant has access to, wherein the generated requested set of data comprises fields from the aggregate two or more datasets and the one or more custom fields specific to the tenant user device.

3. The method of claim 2, wherein the two or more data sets are from respective data stores within the multi-tenant distributed data system.

4. The method of claim 1, further comprising:
transforming two or more datasets from the data that the tenant has access to using a set of transformations from the pre-defined set of possible transformations in accordance with the transformation information, wherein the generated requested set of data comprises the transformed two or more datasets.

5. The method of claim 1, wherein identifying data from the multi-tenant distributed data system that the tenant has access to comprises:
pre-filtering data that the tenant does not have access to based at least in part on the tenant ID.

6. The method of claim 1, wherein identifying data from the multi-tenant distributed data system that the tenant has access to comprises:
identifying datasets within the data that the tenant has access to based at least in part on the data structure, wherein the data structure comprises a format of the datasets, or a size of the datasets, or a combination thereof.

7. The method of claim 1, further comprising:
monitoring execution of the tenant-specific processing instructions and the code received from the provider user device execution by the plurality of worker nodes.

8. The method of claim 1, wherein the input information describes one or more input data tables and the output information describes one or more results data tables.

9. The method of claim 1, wherein the tenant-specific processing instructions comprise a declarative object formatted in accordance with a programming language.

10. The method of claim 1, wherein the code received from the provider user device comprises executable code written to perform data processing and using a programming language.

11. An apparatus for data processing within a multi-tenant distributed data system, comprising:
a processor,
memory in electronic communication with the processor; and
instructions stored in the memory and executable by the processor to cause the apparatus to:
receive, from a tenant user device, tenant-specific processing instructions for a requested set of data, the tenant-specific processing instructions comprising input information, transformation information, and output information, wherein the input information comprises one or more custom fields specific to the tenant user device and a data structure for the requested set of data, and wherein the transformation information is from a pre-defined set of possible transformations;
identify, from the multi-tenant distributed data system, data that the tenant has access to based at least in part on a tenant identity (ID) associated with the tenant user device, wherein the data that the tenant has access to is used to generate the requested set of data;
receive, from a provider user device, code that is executable to process the requested set of data using the tenant-specific processing instructions;
transmit, for execution by a plurality of worker nodes on the data that the tenant has access to within the multi-tenant distributed data system, the tenant-specific processing instructions and the code received from the provider user device to generate the requested set of data; and
transmit, to the tenant user device, the generated requested set of data.

12. The apparatus of claim 11, wherein the instructions are further executable by the processor to cause the apparatus to:
generate, in accordance with the tenant-specific processing instructions and the code received from the provider user device, the requested set of data by aggregating two or more datasets from the data that the tenant has access to, wherein the generated requested set of data comprises fields from the aggregate two or more datasets and the one or more custom fields specific to the tenant user device.

13. The apparatus of claim 12, wherein the two or more data sets are from respective data stores within the multi-tenant distributed data system.

14. The apparatus of claim 11, wherein the instructions are further executable by the processor to cause the apparatus to:
transform two or more datasets from the data that the tenant has access to using a set of transformations from the pre-defined set of possible transformations in accordance with the transformation information, wherein the generated requested set of data comprises the transformed two or more datasets.

15. The apparatus of claim 11, wherein the instructions to identify data from the multi-tenant distributed data system that the tenant has access to are executable by the processor to cause the apparatus to:
pre-filter data that the tenant does not have access to based at least in part on the tenant ID.

16. The apparatus of claim 11, wherein the instructions to identify data from the multi-tenant distributed data system that the tenant has access to are executable by the processor to cause the apparatus to:
identify datasets within the data that the tenant has access to based at least in part on the data structure, wherein the data structure comprises a format of the datasets, or a size of the datasets, or a combination thereof.

17. The apparatus of claim 11, wherein the instructions are further executable by the processor to cause the apparatus to:
monitor execution of the tenant-specific processing instructions and the code received from the provider user device execution by the plurality of worker nodes.

18. The apparatus of claim 11, wherein the input information describes one or more input data tables and the output information describes one or more results data tables.

19. The apparatus of claim 11, wherein the tenant-specific processing instructions comprise a declarative object formatted in accordance with a programming language.

20. A non-transitory computer-readable medium storing code for data processing within a multi-tenant distributed data system, the code comprising instructions executable by a processor to:
receive, from a tenant user device, tenant-specific processing instructions for a requested set of data, the tenant-specific processing instructions comprising input information, transformation information, and output information, wherein the input information comprises one or more custom fields specific to the tenant user device and a data structure for the requested set of data, and wherein the transformation information is from a pre-defined set of possible transformations;
identify, from the multi-tenant distributed data system, data that the tenant has access to based at least in part on a tenant identity (ID) associated with the tenant user device, wherein the data that the tenant has access to is used to generate the requested set of data;
receive, from a provider user device, code that is executable to process the requested set of data using the tenant-specific processing instructions;
transmit, for execution by a plurality of worker nodes on the data that the tenant has access to within the multi-tenant distributed data system, the tenant-specific processing instructions and the code received from the provider user device to generate the requested set of data; and
transmit, to the tenant user device, the generated requested set of data.

* * * * *